US011990006B2

(12) United States Patent
Abrahamson et al.

(10) Patent No.: US 11,990,006 B2
(45) **Date of Patent: *May 21, 2024**

(54) GAMING SYSTEM HAVING EXPANDED NUMBER OF WHEEL SPIN OUTCOME OPPORTUNITIES

(71) Applicant: AGS LLC, Las Vegas, NV (US)

(72) Inventors: Jamie Abrahamson, Las Vegas, NV (US); Eric Ivan Effros, Las Vegas, NV (US); Andrew Price Pawlak, Las Vegas, NV (US)

(73) Assignee: AGS LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,103

(22) Filed: Jan. 12, 2023

(65) Prior Publication Data

US 2023/0169830 A1 Jun. 1, 2023

Related U.S. Application Data

(63) Continuation-in-part of application No. 17/675,315, filed on Feb. 18, 2022, which is a continuation of (Continued)

(51) Int. Cl.
*G07F 17/32* (2006.01)

(52) U.S. Cl.
CPC ........ *G07F 17/3267* (2013.01); *G07F 17/322* (2013.01); *G07F 17/3272* (2013.01); *G07F 17/3288* (2013.01); *G07F 17/3293* (2013.01)

(58) Field of Classification Search
CPC .... G07F 17/3293; G07F 17/3267; A63F 1/00; A63F 1/067; A63F 2001/005; A63F 3/00157; A63F 13/00; A63F 2001/008
See application file for complete search history.

(56) References Cited

U.S. PATENT DOCUMENTS 4,836,553 A 6/1989 Suttle et al.
4,861,041 A 8/1989 Jones et al.
(Continued)

FOREIGN PATENT DOCUMENTS

AU 708104 10/1997
AU 2002314959 12/2002
(Continued)

OTHER PUBLICATIONS

Australian Patent Office; Written Opinion of the ISA for International Application No. PCT/US2018/044431, dated Oct. 5, 2018, in 8 pages.

(Continued)

*Primary Examiner* — William H McCulloch, Jr.
*Assistant Examiner* — Ankit B Doshi
(74) *Attorney, Agent, or Firm* — WEIDE & MILLER, LTD.

(57) ABSTRACT

Table-based gaming actions are disclosed where additional prizes or other gains can be awarded after spinning of a first reward determining wheel of chance by spinning of one or more further wheels of chance where the further spinnings are enabled by a previous spin outcome landing on an outcome selecting segment that awards a partial reward and also awards the spinning of the next successive wheel of chance. Each of the successive wheels of chance is different from the others such that a variety of reward possibilities is provided. Different games, such as presented at different tables, may be linked, where the spinnings offer a jackpot and the odds of each player winning the jackpot is the same, regardless of the game being played.

17 Claims, 6 Drawing Sheets

Related U.S. Application Data application No. 15/865,754, filed on Jan. 9, 2018, now Pat. No. 11,257,325.

(56) References Cited

U.S. PATENT DOCUMENTS

| | | | | |
|---|---|---|---|---|
| 5,292,127 | A | 3/1994 | Kelly et al. | |
| 5,318,298 | A | 6/1994 | Kelly et al. | |
| 5,393,067 | A | 2/1995 | Paulsen et al. | |
| 5,409,225 | A | 4/1995 | Kelly et al. | |
| 5,472,194 | A | 12/1995 | Breeding et al. | |
| 5,584,763 | A | 12/1996 | Kelly et al. | |
| 5,664,781 | A | 9/1997 | Feola | |
| 5,700,007 | A | 12/1997 | Kelly et al. | |
| 5,707,285 | A | 1/1998 | Place et al. | |
| 5,722,891 | A | 3/1998 | Inoue | |
| 5,743,523 | A | 4/1998 | Kelly et al. | |
| 5,743,800 | A | 4/1998 | Huard et al. | |
| 5,788,573 | A | 8/1998 | Baerlocher et al. | |
| 5,848,932 | A | 12/1998 | Adams | |
| 5,911,418 | A | 6/1999 | Adams | |
| 5,967,514 | A | 10/1999 | Kelly et al. | |
| 5,980,384 | A * | 11/1999 | Barrie ................. | G07F 17/3265 463/16 |
| 5,984,779 | A | 11/1999 | Bridgeman et al. | |
| 6,089,978 | A | 7/2000 | Adams | |
| 6,206,373 | B1 | 3/2001 | Garrod | |
| 6,244,595 | B1 | 6/2001 | Kelly et al. | |
| 6,299,532 | B1 | 10/2001 | Smith | |
| 6,299,534 | B1 | 10/2001 | Breeding et al. | |
| 6,334,814 | B1 | 1/2002 | Adams | |
| 6,446,964 | B1 | 9/2002 | Kelly et al. | |
| 6,491,296 | B2 | 12/2002 | Kelly et al. | |
| 6,533,273 | B2 | 3/2003 | Cole et al. | |
| 6,612,574 | B1 | 9/2003 | Cole et al. | |
| 6,612,575 | B1 | 9/2003 | Cole et al. | |
| 6,637,747 | B1 | 10/2003 | Garrod | |
| 6,663,488 | B1 | 12/2003 | Adams | |
| 6,676,517 | B2 | 1/2004 | Beavers | |
| 6,692,355 | B2 | 2/2004 | Baerlocher et al. | |
| 6,705,944 | B2 | 3/2004 | Luciano | |
| 6,827,646 | B2 | 12/2004 | Adams | |
| 6,929,264 | B2 | 8/2005 | Huard et al. | |
| 7,011,581 | B2 | 3/2006 | Cole et al. | |
| 7,100,916 | B2 | 9/2006 | Kelly et al. | |
| 7,235,011 | B2 | 6/2007 | Randall et al. | |
| 7,278,635 | B2 | 10/2007 | Kelley et al. | |
| 7,311,598 | B2 | 12/2007 | Kaminkow et al. | |
| 7,322,886 | B2 | 1/2008 | Manz | |
| 7,566,274 | B2 | 7/2009 | Johnson et al. | |
| 7,618,316 | B2 | 11/2009 | Cole et al. | |
| 7,651,394 | B2 | 1/2010 | Johnson | |
| 7,963,847 | B2 | 6/2011 | Baerlocher | |
| 8,021,230 | B2 | 9/2011 | Baerlocher et al. | |
| 8,096,556 | B2 | 1/2012 | Chamberlain et al. | |
| 8,221,214 | B2 | 7/2012 | Nicely | |
| 8,342,941 | B2 | 1/2013 | Nicely | |
| 8,360,844 | B2 | 1/2013 | Schwartz et al. | |
| 8,460,082 | B2 | 6/2013 | Harris | |
| 8,740,692 | B2 | 6/2014 | Yoseloff et al. | |
| 8,932,125 | B1 | 1/2015 | Harris | |
| 8,956,213 | B2 | 2/2015 | Manz et al. | |
| 8,961,298 | B2 | 2/2015 | Czyzewski et al. | |
| 9,111,414 | B1 | 8/2015 | Sirois et al. | |
| 9,292,996 | B2 | 3/2016 | Davis et al. | |
| 9,401,064 | B2 | 7/2016 | Young | |
| 9,478,099 | B2 | 10/2016 | Czyzewski et al. | |
| 9,536,379 | B2 | 1/2017 | Czyzewski et al. | |
| 9,662,563 | B2 | 5/2017 | Van Asdale et al. | |
| 9,972,169 | B2 | 5/2018 | Davis | |
| 9,997,013 | B2 | 6/2018 | Litman | |
| 10,204,486 | B2 | 2/2019 | Van Asdale et al. | |
| 10,275,993 | B1 | 4/2019 | Charlton | |
| 10,311,681 | B2 | 6/2019 | Litman | |
| 10,395,470 | B2 | 8/2019 | Czyzewski et al. | |
| 10,769,892 | B2 | 9/2020 | Abrahamson | |
| 2002/0042294 | A1 | 4/2002 | Pau et al. | |
| 2002/0195773 | A1 | 12/2002 | Dunn | |
| 2003/0100361 | A1 | 5/2003 | Sharpless et al. | |
| 2003/0153377 | A1 | 8/2003 | Lisowski, Sr. | |
| 2003/0236110 | A1 | 12/2003 | Beaulieu | |
| 2004/0061288 | A1 | 4/2004 | Snow | |
| 2004/0090005 | A1 | 5/2004 | Snow | |
| 2004/0183254 | A1 | 9/2004 | Schlumbrecht | |
| 2005/0059471 | A1 | 3/2005 | Cannon | |
| 2005/0107148 | A1 | 5/2005 | Webb | |
| 2005/0119039 | A1 | 6/2005 | Berman et al. | |
| 2005/0119042 | A1 | 6/2005 | Chamberlain et al. | |
| 2006/0009278 | A1 | 1/2006 | Vancura | |
| 2006/0033268 | A1 | 2/2006 | Wong | |
| 2006/0082057 | A1 | 4/2006 | Luciano et al. | |
| 2007/0054723 | A1 | 3/2007 | Mattice et al. | |
| 2007/0060239 | A1 | 3/2007 | Nelson | |
| 2007/0072668 | A1 | 3/2007 | Hein et al. | |
| 2007/0117608 | A1 | 5/2007 | Roper et al. | |
| 2007/0135204 | A1 | 6/2007 | Nicely | |
| 2008/0009340 | A1 * | 1/2008 | Walker .................... | G07F 17/32 463/25 |
| 2008/0128986 | A1 | 6/2008 | Morris et al. | |
| 2008/0146309 | A1 | 6/2008 | Bennett | |
| 2009/0075715 | A1 | 3/2009 | Coleman et al. | |
| 2009/0203428 | A1 | 8/2009 | Okada | |
| 2009/0239650 | A1 | 9/2009 | Alderucci | |
| 2010/0087241 | A1 | 4/2010 | Nguyen et al. | |
| 2010/0113120 | A1 | 5/2010 | Snow | |
| 2011/0034237 | A1 | 2/2011 | Schulhof et al. | |
| 2011/0059789 | A1 | 3/2011 | Luciano | |
| 2012/0083341 | A1 | 4/2012 | George et al. | |
| 2012/0122545 | A1 | 5/2012 | Watkins et al. | |
| 2012/0142410 | A1 | 6/2012 | Olive et al. | |
| 2012/0244924 | A1 | 9/2012 | Willis | |
| 2012/0322546 | A1 | 12/2012 | Lalumiere et al. | |
| 2013/0029758 | A1 | 1/2013 | Berman et al. | |
| 2013/0143640 | A1 | 6/2013 | Young | |
| 2013/0157752 | A1 | 6/2013 | Yoseloff | |
| 2014/0113712 | A1 | 4/2014 | Van Asdale | |
| 2014/0200071 | A1 | 7/2014 | Czyzewski et al. | |
| 2014/0378205 | A1 | 12/2014 | Montenegro et al. | |
| 2015/0018083 | A1 | 1/2015 | Czyzewski et al. | |
| 2015/0170460 | A1 | 6/2015 | Marais | |
| 2015/0199871 | A1 | 7/2015 | Czyzewski et al. | |
| 2015/0258425 | A1 | 9/2015 | Fisher et al. | |
| 2015/0265913 | A1 | 9/2015 | Fisher et al. | |
| 2015/0379821 | A1 | 12/2015 | LuDuca | |
| 2016/0125689 | A1 | 5/2016 | Hoffman et al. | |
| 2016/0155296 | A1 | 6/2016 | Baron et al. | |
| 2017/0039799 | A1 | 2/2017 | Czyzewski et al. | |
| 2017/0323530 | A1 | 11/2017 | Hemberger et al. | |
| 2019/0043314 | A1 | 2/2019 | Abrahamson | |
| 2019/0347908 | A1 | 11/2019 | Bolling, Jr. | |
| 2020/0394874 | A1 | 12/2020 | Abrahamson | |
| 2021/0312761 | A1 | 10/2021 | Abrahamson | |

FOREIGN PATENT DOCUMENTS

| | | |
|---|---|---|
| AU | 2015203880 | 7/2015 |
| WO | 2000016868 | 3/2000 |

OTHER PUBLICATIONS

Australian Patent Office; Notification of Transmittal of the ISR and Written Opinion of the ISR for International Application No. PCT/US2018/044431, dated Oct. 5, 2018, in 8 pages.

Omaha hold'em—Wikipedia, the free encyclopedia, "https://len.wikipedia.org/w/index.php?title=0maha hold%27em&oldid=722451289", 6 pages, May 28, 2016.

State of Washington Gambling Commission, "Mississippi Stud Training Manual," http://www.wsgc.wa.gov/activities/game-rules/mississippi-stud.pdf, Oct. 28, 2014, 17 pages.

State of Washington Gambling Commission, "Texas Hold 'Em Bonus Training Manual," http://www.wsgc.wa.gov/activitiesigame-rules/texas-hold-em-bonus.pdf, Oct. 28, 2014, 15 pages.

(56) References Cited

OTHER PUBLICATIONS

State of Washington Gambling Commission, "Ultimate Texas Hold 'Em Training Manual," http://www.wsgc.wasgov/activities/game-rules/ultimate-texas-hold-em.pdf. Aug. 11, 2014, 23 pages.
Texas Hold 'Em—Wikipedia, the free encyclopedia, "https://en_ wikipedia org/w/index.php?title=Texas hold %27em&oldid= 718982670", May 6, 2016, 18 pages.
International Search Report and Written Opinion for Application No. PCT/US2017/031511, dated Aug. 7, 2017, 19 pages.
International Search Report and Written Opinion for Application No. PCT/US2017/031560, dated Aug. 9, 2017, 20 pages.
Shanghai Lanbao Sensing Technology Co., Ltd. "CR30S—Products," http:www.shlanbao.cn/en/product/show.aspx?id=1139, Copyright 2011, printed Oct. 21, 2016, 2 pages.
Stmicroelectronics, "VL6180X—Proximity sensor, gesture and ambient light sensing "ALS" module," http://www.st.com/en/imaging-and-photonics-solutions/v16180x.html, Copyright 2016, printed Oct. 21, 2016, 6 pages.
International Search Report and Written Opinion for PCT/US2017/012156 dated Mar. 13, 2017, 27 pages.
State of Washington Gambling Commission, "High Card Flush," http://www.wsgc.wa.gov/activities/game-rules/high-card-flush.pdf, May 28, 2013, 14 pages.
Wikipedia, "Euchre," https//en.wikipedia.org/wiki/Euchre, printed Oct. 19, 2016, 4 pages.
PRNewswire, "AGS Acquires Two Proven Table Game Titles and Bonus Spin™ Technology", Sep. 21, 2015, https://www.prnewswire.com/news-releases/ags-acquires-two-proven-table-game-titles-and-bonus-spin-technology-300146047.html, 3 pages.

* cited by examiner

GAMING SYSTEM HAVING EXPANDED NUMBER OF WHEEL SPIN OUTCOME OPPORTUNITIES

RELATED APPLICATION DATA

This application is a continuation-in-part of U.S. application Ser. No. 17/675,315, filed Feb. 18, 2022, which is a continuation of U.S. patent application Ser. No. 15/865,754, filed Jan. 9, 2018, now U.S. Pat. No. 11,257,325. The present application claims priority to said earlier applications and incorporates by reference each of said applications as if set forth fully herein.

FIELD OF THE INVENTION

The present disclosure of invention relates to operations of a gaming action support machine and certain associated equipment within a gaming environment.

BACKGROUND OF THE INVENTION

Table-based games involving luck, varying amounts of skill and one or more players plus a dealer (human or automated) placed about a game-supporting table are a popular form of wagering games. These table-based games may include, as non-limiting examples, blackjack, poker, baccarat and other types of card, tile and/or chip using games, as well as roulette, craps and other types of dice-using games.

One class of table-based games utilizes a virtual wheel of chance displayed on a relatively large video or other electronic display monitor so that players (and optionally bystanders behind them) can easily see the wheel, its spin motions and the possible results that may ensue from the wheel stopping its spin so that a specific pie slice or other like segment of the wheel is selected (e.g., pointed to) as the spin outcome. The spinning of the wheel and the displayed possible outcomes adds a sense of excitement and expectation for players (and for bystanders).

One example of a table-based game that utilizes a virtual wheel of chance is disclosed in U.S. Pat. No. 5,911,418 issued to Adams issued Jun. 15, 1999 and entitled "Methods of playing card games with an additional payout indicator". The game uses a 10-segment wheel for determining payout when certain card hands (e.g., full house, flush, straight) are drawn. One embodiment of the Adams game features a Double-or-Nothing optional spinning of the same wheel used to select an initial award amount so as to thereby enhance the wagering experience.

Another example of a table-based game is disclosed in U.S. Pat. No. 5,707,285 issued to Place, et al. issued Jan. 13, 1998 and entitled "Method and apparatus for random prize selection in wagering games". A computer is used for random selection of a prize amount. In one embodiment, an electronically controlled spinning wheel with indicator means is used to select the prize.

AGS offers a so-called, Bonus-Spin™ Technology table that may include a two-sided virtual wheel display (showing a customizable virtual prize wheel). In one embodiment, a dealt blackjack 21 hand entitles the player to a spin of the bonus wheel where one of the slices is a progressive Jackpot prize.

Despite the many existing games that include use of real and/or virtual wheels of chance, game suppliers continue to seek new and different games and devices for presenting those games so that the player experience may be further enhanced.

It is to be appreciated that while players enjoy the more well-known table-based games, they continue to seek new games that provide variety, greater excitement and heightened expectations of larger payouts. However, development of new and successful games is complex. A myriad of intertwined criteria are involved. For example, players desire games which are sufficiently challenging to retain their interest, but yet not too challenging to play or difficult to learn. Players also desire wagering games where the wagers are structured in a way in which they increase the tension and excitement of the game, but yet without the wager and payout structures being too complex and thus difficult to understand. In addition, the game must be configured so that it not only offers an apparently reasonable rate of return and/or chance to win to the players, but also assures the house a reasonable rate of return on the playing of a large number of the games. If the rate of return on a game to the house is too low, casinos will not offer the game. If the apparent rate of return to the players is too low, the players will not play the game. With these and other objectives in mind, the here disclosed improvements have been developed.

SUMMARY OF THE INVENTION

Embodiments in accordance with the present disclosure of invention comprise methods of implementing and presenting games, gaming tables, gaming systems and other gaming devices that utilize wheels of chance. More specifically, a gaming system having an expanded number of wheel spin outcome opportunities is provided.

Table-based gaming actions are disclosed where additional prizes or other gains can be awarded after spinning of a first reward determining wheel of chance by spinning of one or more further wheels of chance where the further spinnings are enabled by a previous spin outcome landing on an outcome selecting segment that awards a partial reward and also awards the spinning of the next successive wheel of chance. Each of the successive wheels of chance is different from the others such that a variety of reward possibilities is provided. For one embodiment, a bonus awarding segment of the first wheel has a highest probability of occurrence and a lowest initial payout value.

In one embodiment, a method of presenting a game to one or more players at a gaming table is provided where the method comprises: receiving at least an ante wager from at least one of the players; dealing a predetermined first number N1 of playing cards to each of the players who has placed one or more wagers; receiving an election from said at least one wagering player to check or increase the respective wager after viewing the respective N1 playing cards dealt to that player; determining a game outcome as a result of the playing cards dealt to each of the at least one wagering players; determining an initial reward, if any, for each wagering player who has won, if any, based on a first spinning of a first reward determining wheel of chance where the first reward determining wheel of chance includes at least one bonus spin awarding outcome segment among its possible plural outcome segments; in response to the at least one bonus spin awarding outcome being selected by the first spinning, determining an add-on reward, if any for at least one of the wagering players who won the game based on a second spinning of a second reward determining wheel of chance where the second reward determining wheel of chance is different than the first reward determining wheel of chance.

The method may be one wherein the at least one bonus spin awarding outcome segment of the first reward determining wheel of chance has a probability of occurrence that is among a four largest of probabilities of occurrence of those of all the outcome segments of the first reward determining wheel of chance.

The method may be one wherein the at least one bonus spin awarding outcome segment of the first reward determining wheel of chance has a probability of occurrence greater than 0.50 and the total number of outcome segments of the first reward determining wheel of chance is at least four.

The method may be one wherein the at least one bonus spin awarding outcome segment of the first reward determining wheel of chance provides an initial award having a value that is among a four lowest values provided by all the outcome segments of the first reward determining wheel of chance.

The method may be one wherein the second reward determining wheel of chance is different than the first reward determining wheel of chance in that an add-on reward value and/or probability of occurrence of at least one of outcome selecting segments of the second reward determining wheel of chance is different than that of any of the outcome selecting segments of the first reward determining wheel of chance.

In one embodiment, a gaming apparatus is provided where the gaming apparatus comprises: a game-supporting table having at least one edge along which plural players may be situated; at least one display viewable by the plural players; and a gaming action controller operatively coupled to the at least one display; and wherein the gaming action controller is configured to cause the at least one display to show, with completion of a game played on the game-supporting table, a spinnable first wheel of chance (WHEEL #1) having a plurality of first reward determining outcome selecting segments, with at least one of those first reward determining outcome selecting segments being a first bonus spin awarding segment whose chance selection leads to spinning of a second wheel of chance (WHEEL #2) having a respective plurality of second reward determining outcome selecting segments, the second wheel of chance being different from the first virtual wheel of chance.

The system and method may link multiple games, such as games presented at different game tables. In cases where the bonus spin event offers a chance of one of more jackpot awards, this linking offers the ability offer higher jackpot awards. The jackpots may be progressive jackpots.

In cases where the games which are presented at the different tables have different odds of triggering the bonus spin event, the bonus system may be configured to cause the odds of the selection of a jackpot winning outcome to be normalized as to all players—e.g. so that overall odds of a player winning one of the jackpots as a result of play of a first game are the same as overall odds of a player winning one of the jackpots as a result of play of a second game. In one example, this may be accomplished by changing the odds that a jackpot slice or segment is selected in relation to the odds that a bonus spin event is triggered. As one example, different look-up tables may be used to determine the selection of the outcome of the second wheel spin that includes one or more jackpot segments, whereby the odds of the selection of one of the jackpot segments may be different for different look-up tables.

Further aspects, features, and advantages of embodiments provided in accordance with the present disclosure of invention will become apparent from the below detailed description and associated drawings.

DETAILED DESCRIPTION OF THE INVENTION

In the following description, numerous specific details are set forth in order to provide a more thorough description of illustrative embodiments in accordance with the present disclosure of invention. It should be apparent, however, to those skilled in the art, that the illustrative embodiments are not limiting and the teachings of the present disclosure may be practiced in other ways without need for one or more of the specific details. In other instances, well-known features have not been described in detail so as not to obscure the disclosure.

Figure 1:
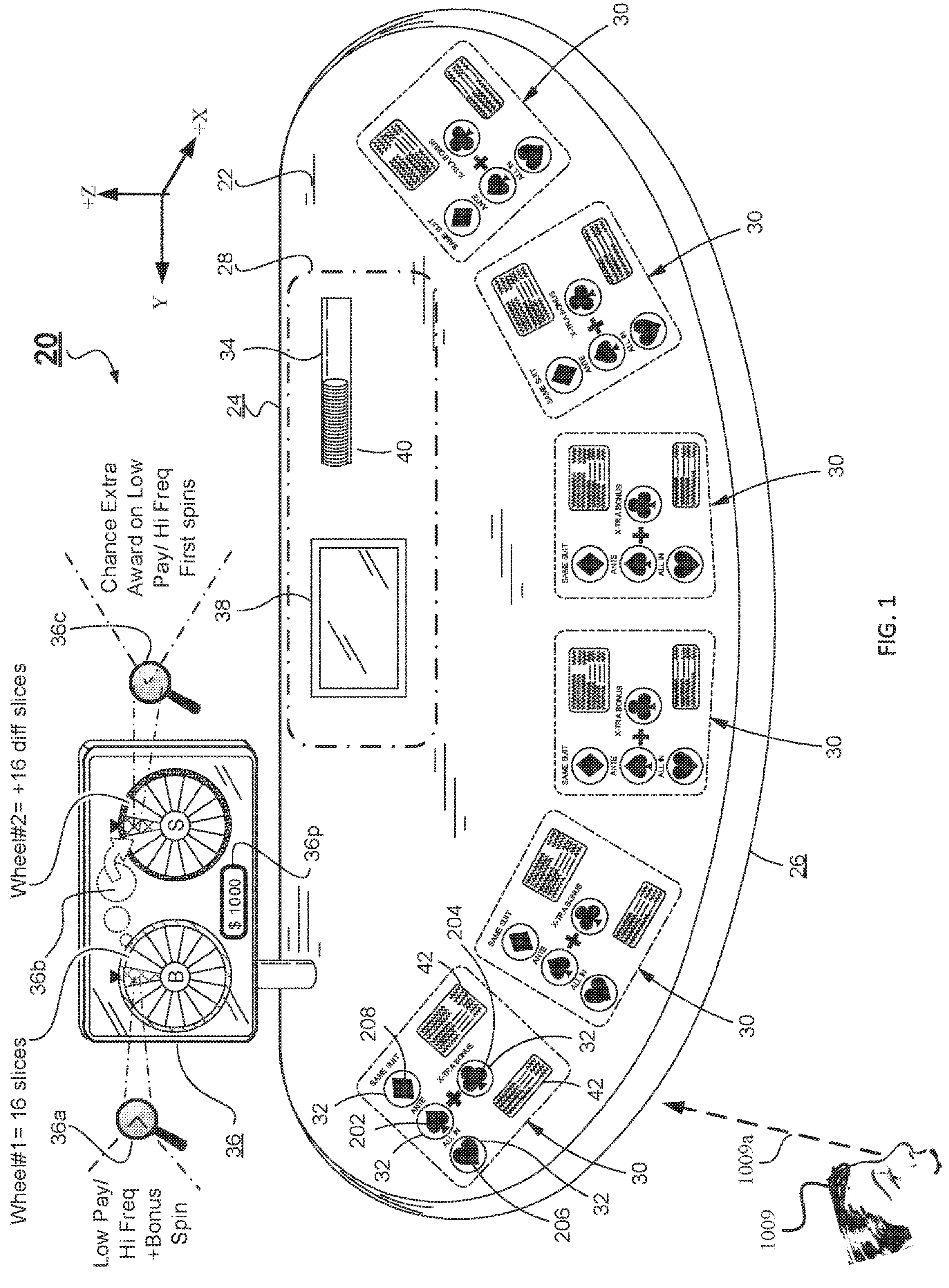
FIG. 1 illustrates a gaming table in accordance with one embodiment of the present disclosure of invention.

One embodiment of a gaming table in accordance with the present disclosure of invention will be described with reference to FIG. 1. As illustrated in FIG. 1, a game playing surface, such as a gaming table 20, is provided. The gaming table 20 includes a top or playing surface 22, typically a textured, contoured and/or marked playing surface 22. The gaming table 20 may include one or more supports, such as a base, legs or the like (not shown) via which the playing surface 22 is elevated above a supporting surface such as a casino gaming floor. Although not shown, secured electronic communication and power cables may extend through one or more of the table supports to connect with casino electronic networks and power distribution means provided under the casino gaming floor.

The shape of the playing surface 22 may vary. In one embodiment, the gaming table 20 has a rear (−X direction), dealer's side edge 24 which is generally straight. The table 20 further has an opposed front (+X direction) edge 26 which is generally arcuate. Resilient bumpers or cushions may be located about either or both edges 24, 26. Players such as 1009 (only one shown) typically position themselves distributively about the arcuate front edge 26 while a casino dealer (not shown) typically positions him or herself behind the rear edge 24.

In one embodiment, the playing surface 22 is predominantly planar. However, the playing surface 22 could have one or more raised areas and/or one or more depressed areas or other features which are integrated into the table or added to the table, such as by being located on or mounted to the top surface thereof. Various game-related information or features are preferably associated with the gaming table 20. In one embodiment, the playing surface 22 comprises a gaming felt or similar element(s) which are located over a substrate, such as a planar support. The gaming felt may bear game play information or other information, such as by printing on the felt. This information may vary, depending upon the game or games which are to be implemented at the gaming table 20. For example, printing on the gaming felt may comprise one or more payout schedules or tables 42, marking for where cards are to be located and other such markings. Specific details (e.g., 202-208) about one embodiment will be provided further below.

In one embodiment, the configuration of the gaming table 20, such as via elements which are associated with the table 20 and information printed on the gaming felt, defines a dealer station 28 from where a dealer may run a game, and one or more player positions 30. The dealer station 28 is generally located by the rear edge 24 while the player positions 30 are located along the front edge 26 opposite to the dealer station 28. The dealer may, for example, stand at the rear of the table adjacent to the dealer station 28. Each respective player (e.g., 1009) may stand or sit adjacent to a respective player position marking 30 provided on the gaming table 20.

In one embodiment, at least one game which is played at the gaming table 20 is a wagering game. Wagers may be placed by moving physical gaming chips or other elements into predetermined positions. In one embodiment, the chips have RFID or like transponders embedded in them and wagers by players may be remotely sensed by wireless detecting of the transponders associated with the respective gaming chips (or other wagering implements) as they placed in near field proximity with one or more input receiving devices or input sensors 32. The input receiving devices or input sensors 32 may comprise transponder proximity sensors disposed under marked locations (32). Alternatively or additionally the marked locations (32) may have button shaped other input device (wired or wireless) that are actuated by the placed chips and/or by the player. The input receiving devices 32 may be located in or on the gaming table 20 and are configured to detect predetermined inputs, such as provided by players positioning betting chips at the playing surface 22. In the case of proximity sensors, the sensors may be any type of proximity sensor including, but not limited to, magnetic, electromagnetic (e.g., RFID), IR, acoustic, capacitive, or the like. For example, the input receiving devices 32 might comprise capacitive type sensors such as Lanbao CR3OS™ series capacitive sensors (produced by Shanghai Lanbao Sensing Technology Co.; www.shlanbao.cn), which sensors behave as standard electrical 4-pin switches where the switch status changes when a chip (or other object, such as a player's hand) is placed on it. In another embodiment, the input receiving devices or sensors 32 might comprise a light sensing device which measures the distance between the sensor and a chip (or other object, such as a player's hand), such as the VL6180X™ ambient light sensing proximity sensor produced by STMICRO (www.st.com).

In one embodiment, one or more input receiving devices 32 are associated with each player position 30, thereby providing a means for each player to provide input relative to game play at the gaming table. The input receiving devices 32 are operatively coupled to an electronic game controller (not shown) such that wagers may be easily placed without need for verbal communication.

In one embodiment, the dealer station 28 may include one or more chip trays 34 which are located on or at the gaming table 20 for storing chips 40 which may be used to pay player winnings and/or in which chips which were used by players to place wagers may be collected by the dealer.

In one embodiment, the gaming table 20 may include a number of other features. For example, the gaming table 20 may include one or more above-the-table displays 36 (above the table as measured along an orthogonal Z axis). The above-table displays (e.g., 36) may comprise one or more single or double sided electronic image displays (such as an LCD, LED, OLED, DLP or other types of displays) or might even comprise mechanical and/or electro-mechanical display devices such as one or more mechanical spinning wheels or reels. The above-table display 36 may be located at or near the gaming table 20 for use in displaying game related information such as pay table information, game status information, game outcome information, bonus information or the like. All players (e.g., 1009) about the table have an unobstructed line of sight 1009*a* to the displayed imagery. The table display 36 might also be used to display promotional information (e.g., reward possibilities) or advertising. In one embodiment, a larger slave copy of the main above-table display 36 may be located on a wall near the table so that on-lookers can easily view the gaming action as it develops at the corresponding table.

The gaming table 20 might also comprise or include various input devices and/or other display devices. The input devices might include one or more dealer-controlled input devices such as one or more buttons and/or a dealer-controlled touchscreen display 38. For example, the dealer display 38 might comprise a display which displays game-related information to the dealer and allows the dealer to provide various inputs. Of course, various other types of input and display devices might be associated with the gaming table 20. The gaming table 20 might also include player-controlled touch-screens, inputs buttons or the like.

Additional details of a gaming table in accordance with one embodiment of the invention will be described with reference to FIG. 2. As illustrated, in this embodiment, elements of the gaming table 20 are associated with or connected to at least one table controller 100. The table controller 100 may be located at the gaming table 20 or may be remote therefrom; for example protectively secured in a locked cabinet elsewhere in the casino.

In one embodiment, the table controller 100 comprises one or more instructible data processing units typically referred to as processors 102 (only one shown) which is/are configured to execute respective data processing operations in accordance with non-transitory machine readable code fixed in a tangible medium (e.g. "software"). The table controller 100 may also comprise one or more information or data storage devices 104 (only one shown). These data storage devices 104 may comprise any type of data storage device such as on or off chip cache, ROM, RAM, EPROM or the like, as well as mass storage devices such as hard drives. The data storage devices 104 may store various data, including game code or software which is executable by the processor(s) 102 and other data, such as game data including wager data, game outcome data, images, etc.

The table controller 100 preferably includes one or more communication interfaces 106 (only one shown). The communication interface(s) 106 may facilitate wireless and/or wired communications with one or more remote systems or devices in accordance with various protocols (USB, Wi-Fi, Bluetooth, Ethernet, Firewire, etc.). In one embodiment, data or information may be exchanged between the processor(s) 102, data storage device(s) 104 and communication interface(s) 106 via one or more data exchange fabrics, such as a system bus 108. Of course, the table controller 100 might have other configurations, including other elements or features.

Figure 2:
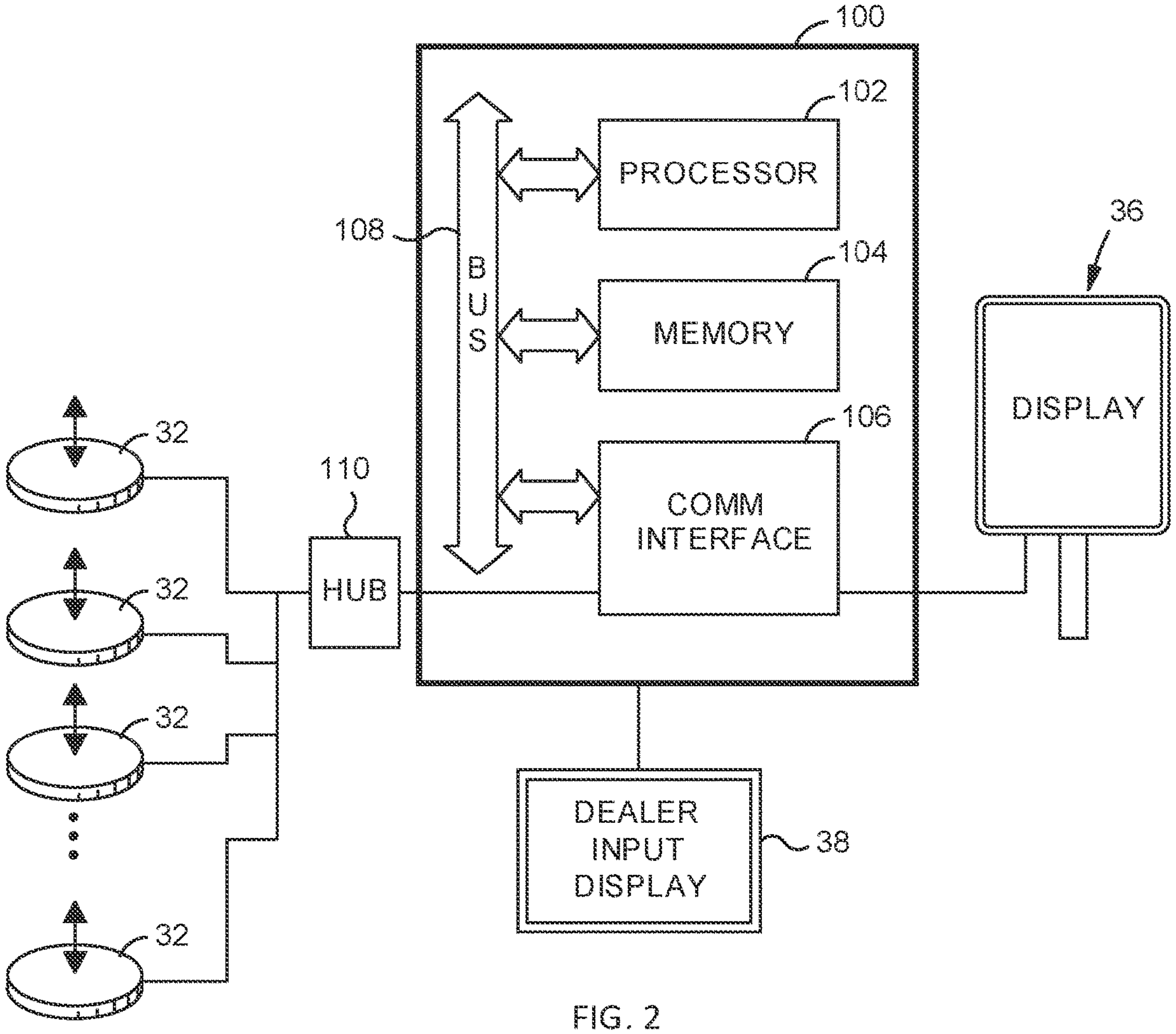
FIG. 2 illustrates a machine-based gaming system in accordance with one embodiment of the present disclosure.

As illustrated in FIG. 2, the one or more input receiving devices 32 of the gaming table 20 may be interfaced with the table controller 100 so that the table controller 100 may receive information from those devices 32 and, in some embodiments, may also transmit information to those devices Likewise, the dealer input and/or display devices, such as the dealer touchscreen 38, may be interfaced to the table controller 100. Also, other input and/or display devices such as the table display 36 may be interfaced to the table controller 100.

In one embodiment, the table controller 100 and/or other devices (e.g., external and operatively coupled other data processing devices, not shown) associated with the gaming table 20 may determine player monetary or chip value balances, including based upon monies associated with play at the table 20 by the player (such as chips purchased), amounts wagered, amounts won, wheel of chance spin outcomes and the like.

The gaming table 20 of the present disclosure of invention may include or be associated with other elements or devices. For example, the gaming table 20 might include other gaming equipment, such as one or more player displays (such as located at each player position 30 and configured to display game information, player tracking information, advertising or other information), card shoe(s), card reader(s), card shuffler(s), player tracking devices (such as for reading a player tracking card or other media of a player for use in tracking the player's game play) and the like. The gaming table 20 might also be connected to external devices. For example, the table controller 100 might be securely coupled (by wire, fiber and/or wirelessly) to one or more casino servers or other data processing systems. These may include a casino accounting server which tracks game play at each of plural gaming tables such as 20, where the tracking may collect information such as that relative to the amounts of wagers placed and winnings paid to the players, among other information. The gaming table 20 might also be connected to a player tracking server and include player tracking elements such as player card readers.

The gaming system might include yet other elements, such as input receiving device controllers or the like. In one embodiment, the input receiving devices 32 communicate with a hub or aggregator 110 which communicates with the table controller 100. The hub 110 may be configured to read or determine the status of each input receiving device 32 and provide information to the table controller 100, such as for example, when the status of an input receiving device 32 changes. The hub 110 may also comprise a power source for the input receiving devices 100. As another example, a proximity-type input sensor might be configured as a USB type device having a USB controller. The table controller 100 may be configured to control the proximity device as a USB device. In this regard, the processor(s) 102 and/or one or more sub-processors or controllers may be utilized to control the input receiving devices 32 and/or the hub 110.

In one embodiment, different input devices might be utilized for receiving different inputs (such as one input device for receiving a wager input and another input device for receiving a "spin" initiating or halting input or the like). In another embodiment, the one or more input receiving devices 32 are configured to receive a plurality of different kinds of inputs. In other words, each input receiving device 32 may be configured to receive two or more inputs. The inputs may be game-related inputs by a player and comprise two or more different types of inputs at two or more different times.

In one or more embodiments in accordance with the present disclosure of invention, aspects of the input receiving devices 32 and/or other devices or elements may be controlled or utilized to facilitate the receipt of the different player inputs. For example, the input receiving devices 32 and/or the table controller 100 may be configured to control the receipt of inputs, such as by selectively activating and deactivating the input receiving devices 32 so that they will receive respective inputs at certain respective times, but not others. In other embodiments, the respective configurations of the respective input receiving devices 32 may change to facilitate detection and filtering of correspondingly expected input(s), such as by changing a detecting sensitivity to thereby distinguish between an intended player input and an unintended input. In yet other embodiments described herein, one or more secondary elements, such as audio and/or visual indicators may be used in conjunction with the input receiving devices 32 to facilitate the input receiving functionality of the input receiving devices 32.

In one example embodiment, a wagering game may be presented at the gaming table 20 where the game may has a base or core game portion and an optional secondary or bonus game portion. For example, the base game portion may comprise a card game which is played with one or more decks of physical playing cards. The bonus game might comprise use of a bonus wheel spin for determining a potential bonus award.

In one embodiment, the input receiving devices 32 may be turned off or may be configured to not report inputs except during designated times. This prevents, for example, inadvertent inputs from being received when games are not being presented or when other activities are occurring. For example, it may be preferable for the input receiving devices 32 to not report/recognize inputs between games or during certain portions of a game where inputs are not allowed according to game rules.

In one embodiment, the input receiving devices 32 may be turned off by providing an instruction to them to not receive or transmit inputs. In other embodiments, the table controller 100 could be configured to ignore input signals from the input receiving devices 32.

In one embodiment, the input receiving devices 32 may be "activated", such as by turning them on or by causing the table controller 100 to be configured to receive inputs from the input receiving devices 32. This step may be implemented by a dealer, such as by input to the one or more dealer input devices. For example, the dealer display 38 might display a "start game/receive wagers" touch-sensitive button which the dealer may select. In response to that input, the table controller 100 may be configured to then receive inputs from the input receiving devices 32 or may send control instructions to those devices to cause them to be activated and may present instructions to respective players such as, "Enter your base bet now".

After activation, one or more first inputs may be provided to the one or more input receiving devices 32. This may comprise, for example, a first type of input such as a wager input, such as via the detection of placement of one or more chips.

In one embodiment, each player who wishes to play the game may be required to place one or more initial wagers (anting in bets). The player might optionally be permitted to place other wagers at the start of the gaming action and/or at later times as the gaming action progresses. For example, a player might be required to place one or more base wagers to play the game and might be permitted to optionally place a bonus wager. In one embodiment, one or more input receiving devices 32 are associated with each player position 30. More than one input receiving device 32 may be provided relative to each player, such as for receiving a base wager and a bonus or side wager.

Figure 3A:
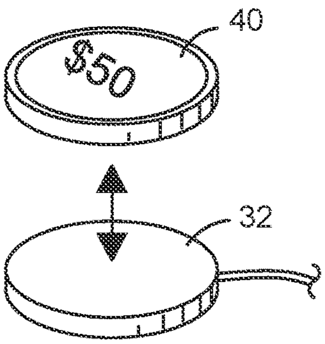
FIGS. 3A and 3B illustrate first and second inputs to an input receiving device in accordance with the present disclosure.

In one embodiment, a wager input may be provided by a player placing one or more chips 40 on or adjacent to a particular input receiving device 32, such as illustrated in FIG. 3A. At that time, the wager input(s) may be detected by those devices 32 and may be transmitted to the table controller 100 for processing and storage. Wager information may be displayed to the dealer, such as via the dealer display 38. The dealer might then collect the wager-defining chips and place those wagered chips in the chip tray 34.

In one embodiment, after a first input period, the input receiving devices 32 may again be deactivated. Once again, this may comprise a dealer providing input to the dealer input device(s), such as the dealer touchscreen 38. For example, the dealer touchscreen 38 might display a "close wager" button which the dealer may select. This may cause the table controller 100 to no longer receive inputs from the input receiving devices 32 and/or to send a control instruction to those devices to de-activate them.

At one or more times, the input receiving devices 32 may be configured to receive one or more additional or second inputs. Such a secondary input might comprise a secondary or other additional wager. One or more of the secondary inputs may comprise a different type of input than the first input. In order to receive the at least one secondary input, the input receiving devices 32 may again be re-activated and optionally reconfigured for a different kind of input. In one embodiment, only certain input receiving devices 32 may be activated for receiving particular inputs. For example, a player who placed a bonus wager and received a certain bonus-triggering result from the play of a base game might be permitted to participate in a bonus event, such as one or more bonus wheel spins. As described below, in one embodiment, a player might be entitled to a corresponding one or more spins of respective award wheels whose outcomes select or determine one or more awards, such as awards for having won a bet. The here disclosed spin technology may be implemented relative to a variety of games, including for example blackjack, baccarat, poker and other such card-utilizing or other symbols-collecting games. Preferably, the input receiving devices 32 corresponding to only those players who are entitled to participate in the bonus event, award event or the like might be activated. The input receiving devices 32 relative to the other players preferably remain inactive, such as to prevent accidental input thereto.

Figure 3B:
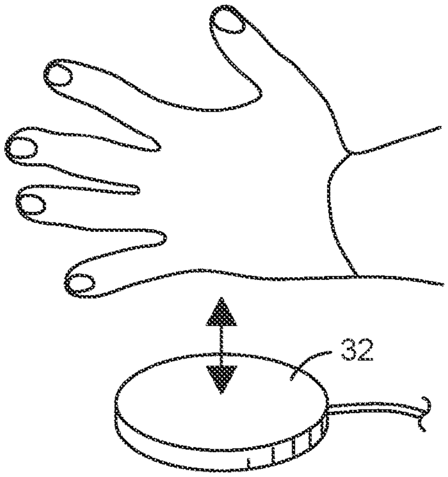

In one embodiment, an input signal might comprise a player placing their hand, one or more fingers or another body part or the like on or adjacent to the input receiving device 32, or waving their hand across the device (for example in a predetermined gesture), such as illustrated in FIG. 3B for example, using the above-referenced VL6180X ambient light sensing sensor, where the sensor detects the presence of the player's hand proximate to the sensor and by determining a distance of the player's hand from the sensor by determining a flight time of projected light (e.g., an IR light beam) which is reflected from the player's hand back to the sensor in order to receive the player's hand gesture as a valid input. In response, one or more game features or the like may be implemented by the table controller 100 and/or dealer in response to the received and recognized input signal. For example, in response to the detection of a player's hand, an input receiving device 32 may send a signal to the table controller 100. The table controller 100 may then be configured to cause the table display 36 to display the image of a first wheel (e.g., virtual WHEEL #1) which rotates and then settles into a stopped position that indicates a specific award or bonus location (pie slice) as the wheel determined outcome, such as indicated by the hashed wheel slice in FIG. 1 for the illustrated WHEEL #1. The bonus spin outcome or award selection event may result in the player being awarded a bonus win or a selected award.

It is to be understood that the exemplary simultaneous display of plural wheels of chance (e.g., WHEEL #1 and WHEEL #2) is not necessarily to scale or relative scale and the illustrated plural wheels are not necessarily both displayed or both displayed at apparent same size at a same time. At one point in time, the first wheel (WHEEL #1) may be displayed as large and predominant while the second wheel (WHEEL #2) may be displayed as diminutive or not at all present. Then after WHEEL #1 is spun and its outcome revealed, WHEEL #1 may shrink in size while the second wheel (WHEEL #2) emerges (e.g., it inflatingly bubbles out as indicated at 36*b*) from the outcome slice (hashed) of stopped WHEEL #1 to become a display area dominating next wheel of chance that is to be spun or which automatically begins spinning. Although just two wheels of chance are illustrated by way of example in FIG. 1, it is within the contemplation of the present disclosure to have more than two such wheels where, according to one aspect of the present disclosure, no two successively spun wheels (e.g., WHEEL #1, WHEEL #2, WHEEL #3, etc., only first two are shown) are identical to one another with respect to the possible rewards offered by that wheel and/or probabilities of occurrence for the respective possible rewards offered by that wheel.

The merely exemplary illustration in FIG. 1 shows that the first-to-be-spun wheel (WHEEL #1) consists of 16 pie slices (outcome segments) and that the second-to-be-spun wheel (WHEEL #2) consists of 16 pie slices (outcome segments). However, in accordance with the present disclosure of invention not all the slices of the first wheel (WHEEL #1) are identical to those of the second wheel (WHEEL #2). The first-to-be-spun wheel (WHEEL #1) contains at least one slice whose contained symbolism represents a relatively low award value (e.g., low or no payout) plus an opportunity to next spin a different and possibly award augmenting, next wheel of chance (e.g., WHEEL #2). In one embodiment, the augmentation can be in the form of an above unity multiplication of an initially awarded prize (e.g., ×2, ×3, ×5, etc.) that replaces the initially awarded prize. In another embodiment, the augmentation can be in the form of an add-on reward that is added on top of an initially awarded prize (e.g., +$100, +$200, +$500, etc.).

In one embodiment, each pie slice in each respective wheel of chance covers a same apparent area (or same apparent sweep angle) as the other slices of that respective wheel. However, due to programming of the game controller (e.g., 100), different probabilities of occurrence are assigned to the slices of the respective wheels for becoming the selected outcome result of a spinning of that wheel. One slice might be designated as a so-called, Jackpot slice that provides a relatively maximal award if hit while one or more other slices provide successively lower award amounts. In order to keep the gaming establishment solvent, the Jackpot slice (not explicitly shown) may be programmed to have a very low or minimal frequency of occurrence. The Jackpot award can be fixed or progressive (e.g., a local, casino or wide area progressive prize). In order to keep players engaged at the table, one or more of the lower paying slices may be programmed to have substantially higher frequencies of occurrence. Thus, although it feels to players that the Jackpot slice is almost never randomly picked as the game action outcome, it also often appears to players that the lower paying slices are often picked as the game action outcome (e.g., 2 out of every 3 spins). Thus players have a relatively high expectation that one of the lower paying slices will be randomly picked as the game action outcome.

In accordance with an aspect of the present disclosure of invention, at least one of the lower paying slices (e.g., lowest paying one) having a relatively highest frequency of occurrence (e.g., highest or one of the N most high, N being a small whole number such as 2, 3 or 4) includes a symbolism indicating that a bonus spin on a different other wheel of chance (e.g., WHEEL #2) will be awarded. Thus, even before the first wheel (WHEEL #1) is spun on behalf of a player (e.g., bet winning player), that player has a relatively high expectation that one of the lower paying slices that contains a bonus spin (as indicated in magnification 36a) will be randomly picked as the game action outcome and therefore the player will have a chance of winning even more with the awarded bonus spin of the different second wheel (WHEEL #2). One such additional or add-on reward is indicated by magnification 36c of FIG. 1.

An advantageous result of such an arrangement is that a relatively large number of enticing outcomes may be displayed to potential players in an easily comprehendible fashion. A typical wheel of chance may have no more than say, 10 to 12 displayed slices, where 6 to 8 displayed slices is more common. If there are too many displayed slices (e.g., more than 12) then it becomes difficult for players to read the thin sliced symbolism in each wheel segment. Also if there are too many displayed slices, it becomes difficult for players to comprehend what array of possible awards is being offered by a spin of that wheel (e.g., WHEEL #1). On the other hand, if there is only a relatively small number of slices; say Jackpot plus two low payout slices and one intermediate payout slice (a total of 4 slices), then players will often deduce from the low number that there is low likelihood for a high return on that wheel because the Jackpot is almost never picked and after that, the number of low payout slices outnumbers the intermediate payout slices by a substantial ratio (e.g., 2:1). So they will be discouraged from playing at such a gaming table.

By organizing the first-to-be-spun wheel (WHEEL #1) to have at least one lower paying slice (e.g., lowest paying slice) that contains a bonus spin (as indicated in magnification 36a) and by organizing the second-to-be-spun wheel (WHEEL #2) to have chances at different, supplementing awards, game designers can create the effect of having a wheel of chance with a relatively large effective number of slices (e.g., 16 slices contributed by the first-to-be-spun wheel, WHEEL #1 plus 16 different slices contributed by the second-to-be-spun wheel WHEEL #2 to thus create an impression of 32 different possible outcomes). More specifically, as a non-limiting example, if the probability of occurrence (of being the spin outcome) of slice 36*a* of WHEEL #1 is $P_{1a} \geq 0.50$ (or $P_{1a} \geq 0.25$ or $P_{1a} \geq 0.1$ in alternate embodiments) and it provides not only a minimal reward of $R_{min}$ but also an opportunity to spin the second wheel (WHEEL #2) where the latter includes slices enumerated as c, d, e, etc. with respective probabilities of occurrence of $P_{2c}$, $P_{2d}$, $P_{2e}$ etc. each greater than 0 and respective outcome rewards of $R^{2c}$, $R_{2d}$, $R_{2e}$ etc., then the effective probabilities of occurrence for the latter when considering spins of both of the wheels will be $P_{1a} \cdot P_{2c}$, $P_{1a} \cdot P_{2d}$, $P_{1a} \cdot P_{2e}$ etc. and the respective total outcome rewards will be $R_{min}+R_{2c}$, $R_{min}+R_{2d}$, $R_{min}+R_{2e}$ etc. where the $P_{1a} \cdot P_{2x}$ products (x being c, d, e, etc. here) are sufficiently large and the corresponding payouts $R_{min}+R_{2x}$ are also sufficiently large to encourage players to continue playing but not so large that it becomes unprofitable for the casino to offer the corresponding gaming action. Therefore, by setting probability $P_{1a}$ and its corresponding initial payout $R_{min}$ appropriately, game designers can create the effect of a many sliced wheel of chance without crowding all the slices into one unappealing wheel.

In one embodiment, rather than selecting a bonus spin providing outcome slice (wheel segment) to be the one with the very lowest initial payout ($R_{min}$) and the very highest probability of occurrence, the initial payout ($R_{init}$) of an at least one bonus spin providing outcome slice of a wheel in accordance with the present disclosure may be one of the lowest 2 to 4 of the lowest initial payout segments of the wheel providing the wheel has a greater total number of segments. Alternatively or additionally, rather than selecting a bonus spin providing outcome slice to have the very highest probability of occurrence, the at least one bonus spin providing outcome slice of a wheel in accordance with the present disclosure may be one of the highest 2 to 4 of the 8 or more segments of the wheel having the highest probabilities of occurrence. It is not necessary for any or all of the highest 2 to 4 probabilities of occurrence to be greater than 0.50. Game designers may use other formulations for picking the relatively low initial payouts ($R_{init}$) and relatively high probabilities of occurrence of the bonus spin providing segments in view of the $P_{1a} \cdot P_{2x}$ products and $R_{init}+R_{2x}$ sums discussed above.

While the example illustrated in FIG. 1 shows the formation of an effect of 32 slices because the exemplary first wheel (WHEEL #1) has 16 slices and the second-to-be-spun wheel (WHEEL #2) has a same number of 16 slices, it is within the contemplation of the present disclosure to have numerous variations including where the respective number of slices on each respective wheels of chance is not the same and that including where the number of wheels to be optionally spun (if bonus spin slices come up) is greater than two. In other words, in one embodiment (not shown), the second-to-be-spun wheel (WHEEL #2) may itself have one or more slices that offer yet further bonus spins on a respective one or more further wheels of chance (e.g., WHEEL #3, WHEEL #4, etc.—not shown). Other possible combinations of number of slices for the consecutive spun wheels (assuming the bonus spin slices come up in the preceding wheels) are shown in below Table 1.

TABLE 1

| row | WHEEL#1 | WHEEL#2 | WHEEL#3 | Total |
|---|---|---|---|---|
| a | 4 | 8 | 0 | = 12 |
| b | 6 | 6 | 6 | = 18 |
| c | 8 | 8 | 8 | = 24 |
| d | 12 | 8 | 0 | = 20 |
| e | 10 | 10 | 8 | = 28 |
| f | 12 | 12 | 12 | = 36 |

In one embodiment, each reward determining wheels of chance (e.g., WHEEL #1 through WHEEL #3) has not less than four (4) outcome selecting segments (OSS's, also referred to as slices) and no more than sixteen (16) such outcome selecting segments. In one sub-embodiment, the number of outcome selecting segments for respective ones of the wheels satisfies a selected one of the following ranges: 6≤NOSS≤12; 8≤NOSS≤10; 6≤NOSS≤10; 4≤NOSS≤8; 8≤NOSS≤12; where NOSS stands for number of outcome selecting segments.

Reward amounts and probabilities for each on a per wheel basis are sometimes specified using a frequency of occurrence table such as illustrated in Table 2.

TABLE 2

| row | Frequency of occurrence for WHEEL#1 | Reward to Spinning Player if hit | Reward to Rest of Entitled Players (Community Award) | Slice position on WHEEL#1 |
|---|---|---|---|---|
| a | 1 | Posted JACKPOT Amount (which could be a progressive) | 0 | s0 |
| b | 5 | $5,000 | 0 | s3 |
| c | 20 | $2,500 | 0 | s7 |
| d | 80 | $1,000 | 0 | s5 |
| e | 325 | $750 | 0 | s10 |
| f | 500 | $500 | $50 | s2 |
| g | 880 | $350 | $25 | s8 |
| h | 950 | $250 | 0 | sl 1 |
| i | 2,800 | $100 | 0 | s9 |
| j | 5,500 | $75 | 0 | s6 |
| k | 8,500 | $70 | 0 | s4 |
| 1 | 25,439 | $50 + Spin W2 | 0 | sl |
| Total | = 45,000 | | | s0:s11 |

As seen in exemplary Table 2, the probability of occurrence for the slice designated as s1 of 12 slices s0:s11 is (25439/45000)=0.565 . . . ≥0.50 and it provides not only a minimal reward of $R_{min}$ of $50 but also an opportunity to spin the second wheel (WHEEL #2). In one embodiment, the slice numbers s0 through s11 (s0:s11) are positioned sequentially about the circle of slices (reward outcome segments) in accordance with their slice number. Thus in the example of Table 2, the at least one bonus spin providing slice s1 is positioned immediately adjacent to the JACKPOT slice s0. At least one of the JACKPOT slice s0 and bonus spin providing slice s1 may be attractively decorated to draw player's to that angular section of the first wheel (WHEEL #1). Because of the assigned disparate probabilities of occurrence for the JACKPOT slice s0 and the angularly following bonus spin providing slice s1 of one embodiment, the spinning action of the first wheel (WHEEL #1) will often (e.g., $P_{1a}$≥0.50 or $P_{1a}$≥0.25) appear to be stopping on the JACKPOT slice s0 but then slip forward to the angularly following bonus spin providing slice s1 and stop there. Players may be disappointed by the appearance that they just missed the JACKPOT but will also at the same time have positive emotions and expectations due to the possibility of winning something big during the awarded bonus spin of the second wheel (WHEEL #2). In one embodiment, the contents of each the reward determining wheels of chance is prominently displayed (advertised) between games so that potential players can have a clear idea of what rewards are possible.

In one embodiment, the second wheel has 8 slices and is organized for example as shown in Table 3.

TABLE 3

| row | Frequency occurrence for WHEEL#2 | Reward to Spinning Player if hit | Reward to Rest of Entitled Players (Community Award) | Slice position on WHEEL#2 |
|---|---|---|---|---|
| a' | 1 | $200,000 | 0 | s0 |
| b' | 5 | $75,000 | 0 | s3 |
| c' | 10 | Cruise around the world | 0 | s6 |
| d' | 8 | $100,000 | $500 | s5 |
| e' | 50 | Trip to Exotic Location | 0 | s4 |
| f' | 926 | $50,000 (optionally plus Spin W3) | $250 | s2 |
| g' | 20,000 | $25,000 | $100 | s7 |
| h' | 25,000 | Casino Jacket | $5 | sl |
| Total | = 46,000 | | | s0:s7 |

As seen in exemplary Table 3, additional different rewards and/or with different probabilities of winning can be offered. Players can be shown all the possibilities with the understanding that they need to land the bonus spin slice on the first wheel (WHEEL #1) in order to get an opportunity at the second-to-be-spun wheel (WHEEL #2). In an alternate embodiment, the second wheel (WHEEL #2) may itself have one or more bonus spin slices that lead to additional other wheels of chance. In one embodiment, the second wheel (WHEEL #2) has more and/or larger community prizes than does the first wheel (WHEEL #1). As a result, the remaining players around the table who are not spinning will tend to root for the spin actuating player to hit the bonus segment on the first wheel (WHEEL #1) so that they may have a chance at the greater number of and/or larger community prizes displayed on the second wheel. Although not shown, it is within the contemplation of the disclosure that if a spin of a third wheel (WHEEL #3) can be won through spinning of at least one of the first and second wheels (WHEEL #1 and WHEEL #2), then the third wheel will also have more and/or larger community prizes than does the first wheel (WHEEL #1) and optionally, than does the second wheel (WHEEL #2). In one embodiment, where at least three wheels of chance are offered by way of the reward determining process, the first-to-be-spun wheel (WHEEL #1) is denoted as the Bronze medal wheel (or equivalent other such designation), the second-to-be-spun wheel (WHEEL #2) is denoted as the Silver medal wheel (or equivalent other such designation) and the third-to-be-spun wheel (WHEEL #3) is denoted as the Gold medal wheel (or equivalent other such designation). Such a multi-tiered designation system can help players to better understand which wheel has the higher valued rewards and/or where those higher valued rewards are displayed and what sequence of wins is required to attain those higher valued rewards. Although the exemplary Table 2 indicates that the player always wins something of value, it is within the contemplation of the disclosure that the second-to-be-spun wheel (WHEEL #2) and/or the third-to-be-spun wheel (WHEEL #3) may respectively have outcome selecting segments that provide no add-on reward (e.g., $0).

In one embodiment, the differences between the respective wheels of chance (e.g., WHEEL #1 and WHEEL #2) is made more apparent to players by use of various differentiating attributes. For example, the respective wheels may have differently colored and/or textured outer rims (represented in FIG. 1 by the different hash fills for the rims of WHEEL #1 and WHEEL #2). The wheels may alternatively or additionally respectively have different colorations for alternating ones of their respective slices. More specifically, the first-to-be-spun wheel (WHEEL #1) may have traditional alternating red and black background colors going around the circle of slices. On the other hand, the second-to-be-spun wheel (WHEEL #2) may have alternating blue and white or yellow background colors going around the circle of its slices. The wheels may be ascribed different names that are displayed adjacent to their images such as Bronze, Gold and Silver to give a sense of the rewards they offer. The wheels may have center regions (at the center of trapezoidal/radial slices) with different colors, lighting patterns and/or graphic designs. For example, FIG. 1 shows the center region of WHEEL #1 to be denoted with the wheel identifier symbol "B" for Bronze and the center region of WHEEL #2 to be denoted with the respective wheel identifier symbol "S" for Silver. One or more of the different wheels may have outer rim shapes other than smooth circular, for example different radially-poking out shapes such as gear teeth or spokes with end shapes (e.g., triangular gear teeth, trapezoidal gear teeth, diamond shaped spoke ends, club shaped, heart shaped, etc.).

It is to be understood that different game rules may give more than one player a chance at spinning the successive wheels of chance. By "chance at spinning", the present disclosure contemplates having a player actuate an input receiving device (e.g., 32) so as to begin the displayed spinning action of a respective wheel of chance, so as to begin the displayed slowing to a stop of the spinning action of a respective wheel of chance or twice actuating an input receiving device so as to respectively start and end the spinning action. In one embodiment, the dealer may actuate an input receiving device in a dealer-controlled area for performing one of the start and end of the spinning action while the player actuates for the other. In one embodiment, the game controller 100 automatically actuates one or both of the displayed start and end of the displayed spinning action of a respective wheel. In cases where plural players are entitled to opportunities at the wheel, the process might be repeated relative to each player who is entitled to a first and any optional successive bonus spins. In one embodiment, the input receiving device 32 corresponding to a first player is activated and receives an input from that player, the wheel spinning feature is implemented and then that input receiving device 32 may be inactivated. The input receiving device 32 relative to a second player may then be activated, and so on.

Figure 4:
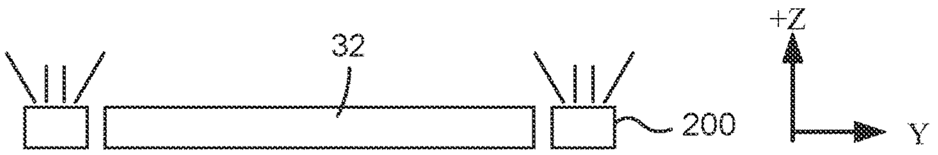
FIG. 4 illustrates an input receiving device having an associated indicator in accordance with one embodiment.

In one embodiment, the system might include one or more input receiving device indicators. These indicators might comprise, for example, audio, tactile and/or visual indicators. The indicators may provide an indication, such as by sound, haptic feedback, light (including color), text or the like, of a status of an input receiving device 32 or an activity associated therewith. As one example, a visual indicator such as a color or multi-color light ring 200 might be located around an input receiving device, such as illustrated in FIG. 4. Of course, such an indicator might otherwise be located adjacent to an input receiving device 32 or even over such a device. The indicator lights might be located inside the device if the device is equipped with a translucent surface.

In one embodiment, the indicator(s) might provide an indication or information to a user comprising one or more of: (1) an inactive status of the input receiving device; (2) an active or ready for input status of the input receiving device; and (3) accepted or received input to the input receiving device. In one embodiment, the one or more indicator(s) are controlled in conjunction with the input receiving devices, such as via the table controller.

As one example, when an input receiving device is inactivate, an associated indicator (such as a light ring around the input receiving device) might be illuminated red. When it is active, and ready for a particular input, it might be illuminated flashing green. When an input is received, the flashing green light might transition to a steady green light. Also the main table display 36 may indicate the received status of the player's action with respect to the given input receiving device 32.

Figure 5A:
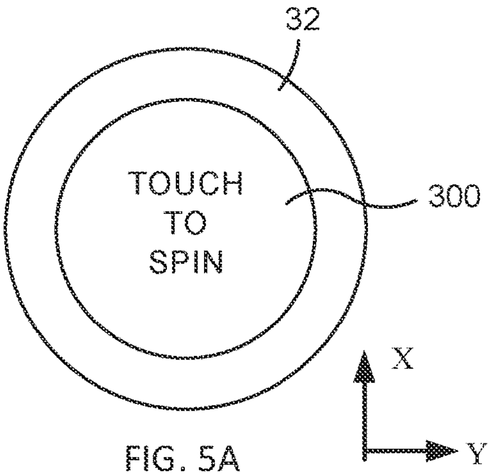
FIGS. 5A and 5B illustrate an input receiving device having an associated indicator in accordance with an embodiment.
Figure 5B:
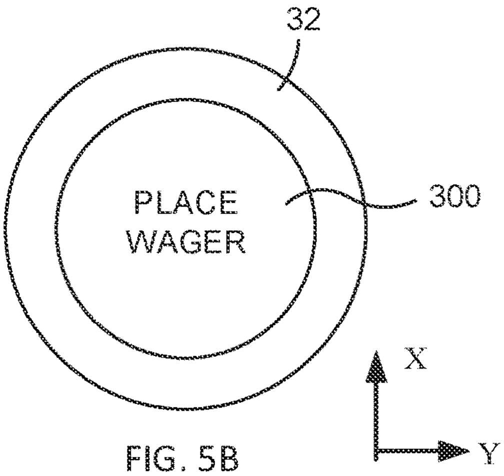

In the same or another embodiment, text or other instructions might be displayed by the one or more associated indicators. For example, as illustrated in FIGS. 5A and 5B, an images providing screen 300 (e.g., backlit LCD) may be located over or may be located adjacent to an input receiving device 32. The screen 300 might display "place wager" when the input receiving device is configured to receive a wager (as shown in FIG. 5B) and might display "touch to begin spin", or "touch to end spin" or other instructions when the input receiving device is configured to receive a player spin input (as shown in FIG. 5A).

Of course, the indicator(s) may have various configurations. Preferably, the indicator(s) are located adjacent to or are associated with (and may even be integrated with) the input receiving device(s) 32.

As one example of the use of an input device where one or more indicators are utilized, an indicator associated with an input receiving device or sensor 32 may be activated to indicate to a player that their input receiving device 32 is ready to accept a wager. This might comprise, as indicated above, causing the indicator to illuminate a flashing green light, to cause a display to show a "place wager" instruction or the like. The input receiving device 32 may then receive an input in the form of one or more chips placed by the player.

The indicators may then be activated to indicate that a given wager period is closed. This might comprise, for example, the indicators being illuminated red or displaying a "wagers closed" instruction or the like. Thereafter, such as after various steps of the game, an indicator may be activated to indicate that an associated input receiving device or sensor 32 is ready for an initial or bonus spin input. This may comprise the indicator illuminating a flashing green light, showing a "touch to begin spin" instruction or a "touch to end spin" instruction or the like. A player's input to the associated input receiving device 32 may then be detected and recorded, for example in a fault/fraud-resistant memory.

In one embodiment, the indicator may be activated to indicate that the input was received from the player. For example, once the input receiving device 32 detected the player input and sent information regarding this input to the table controller 100, the table controller 100 may cause the indicator display a steady green light or to display an "input received" indication. Thereafter, the game feature might then be implemented based upon the player input.

Of course, at a gaming table where multiple players are playing, the indicators may indicate a particular status of an input receiving device corresponding to each player, where the status may vary from player to player. This allows the indicators to provide information to each player which is unique to that player. For example, during an initial or bonus spin event phase or an award selection event phase, only the indicator associated with the input receiving device of a player whose turn it is to participate in the event may indicate such (while the indicators associated with the input receiving devices of the other players may indicate that no input is to then be provided by those players).

Of course, the indicators may be used in various manners. For example, the indicators might always be activated in a manner which confirms receipt and registration of each player input, whether of a wager or a direct input, rather than just asking for a player's direct input. In one embodiment, the status of the indicators may be automatically controlled by the table controller 100 or might be controlled by the dealer, or both. For example, a dealer might provide input which opens and closes a wagering period. When the dealer opens the wagering period, the indicators (via control from the table controller based upon the dealer's input) might indicate that the input receiving devices 32 are ready to receive wagers and when the dealer closes the wagering, the indicators may indicate that no more wagering inputs are being accepted (again as controlled from the table controller based upon the dealer's input).

As indicated herein, in one embodiment, input receiving device(s) 32 may move between active and inactive conditions. While the dealer may provide inputs to the table controller 100 to control input receiving device activation and de-activation, such might be at least partially automated. For example, in response to a dealer selecting a "start game" option, the table controller 100 might automatically activate the input receiving devices 32 for purposes of receiving player wagers. The table controller 100 might automatically close wagering after a certain time, such as 1 minute and/or in response to a predetermined event, by automatically de-activating all of them.

In another embodiment, the input receiving device(s) 32 might always be active or might be inactive between games but always active during game play. In such an embodiment, in order to reduce chance of inadvertent input to the input receiving devices(s), the indicators described above might be utilized. For example, instead of an input receiving device being truly inactivated, the associated indicator may indicate to a player that they should not provide an input to the device (although if the player did, such an inadvertent input might then still be registered).

In one embodiment, the input receiving device(s) 32 may be controlled to change one or more characteristics thereof, such as detection sensitivity of one or more sensors within the device. As one example, the table controller 100 or another controller might be used to implement a first input sensitivity of an input receiving device, such as relative to the detection of one or more chips, but another or second input sensitivity at another times. For example, an input sensitivity or similar characteristic might be controlled in order to reduce the chances for inadvertent input to the input receiving device 32, such a player's hand inadvertently passing over or near the device. This feature might be used, for example, to distinguish between a true "spin" start/end input (or other input from the player) which is provided by a player's hand or the like, and an inadvertent passing of a portion of the player's hand or another object near the sensor which is not intended as the respective input. As another example, the input receiving device 32 might be configured to require an input of a length of time, such via detection of a player's hand adjacent to the input receiving device(s) for a period of time which would essentially avoid inadvertent inputs from being logged due to momentary passings by the hand. This type of input receiving device control, particularly as relative to varying proximity sensor sensitivity, may have particular applicability to the present disclosure of invention where the game may call for multiple inputs from a player, including sequential spins of different wheels of chance (e.g., first WHEEL #1 and second WHEEL #2) during different times of the game.

Additional details of methods, devices and systems in accordance with the present disclosure of invention will now be described. An aspect of the present disclosure comprises a machine-assisted method of presenting and playing a game. In one embodiment, the game is played between one or more players and a dealer or the house. In one example embodiment, the method may be implemented relative to a computer-driven gaming table. The gaming table might comprise the gaming table 20 described above, such as including the various input devices 32, table display 36 and other features, or it might comprise a gaming table which does not include some or all of such features, or might include other features.

Figure 6:
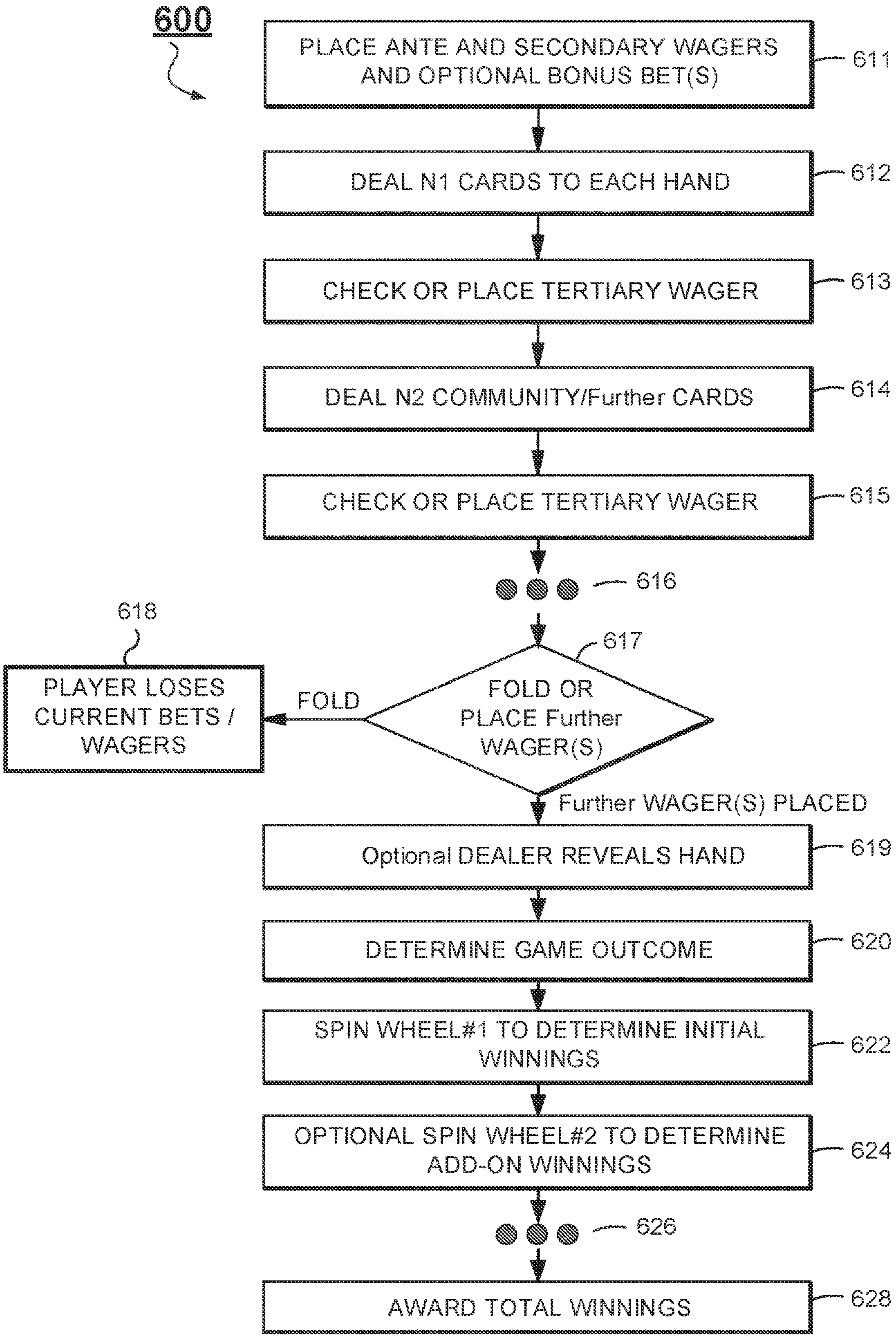
FIG. 6 is a process flow diagram which illustrates embodiments of presenting and playing games in accordance with the present disclosure of invention.

Referring to FIG. 6, in one embodiment 600, the table-based game is played and presented as a wagering game. Thus, in a step 611, each participating player places one or more wagers. In one embodiment, a player is required to place an ante wager and possibly also a secondary wager. In one embodiment, an ante wager location 202 and a secondary wager location 204 are shown or displayed on the gaming table 20, as illustrated in FIG. 1. As indicated above, at least one input sensor 32 may be located at those wager locations for detecting the respective wager. In one embodiment, a player places one or more chips, coins or the like at the wager location(s), such as by locating the one or more chips or the like in proximity to the one or more sensors for detection thereby. The sizes of the ante and secondary wagers may have respective minimum and/or maximum values, and in one embodiment, they are required to be of the same amount or size. In such an embodiment, a single input sensor or receiving device may sense a player's location of a chip proximate thereto, thus registering the value of the chip as the wager amount for both the ante wager and the required secondary wager of equal size.

In one embodiment, a player may optionally further place one or more bonus or side bets. The bonus or side bets. In one house banked poker-style embodiment, such bonus or side bets may comprise a first optional Same Suit bonus bet that is winning if the player's hand comprises a predetermined winning Flush hand. Alternatively or additionally, the one or more bonus or side bets may instead comprise a 3 Card Flush side bet that is winning if the first three cards dealt in the game comprise a 3 Card Flush. The player may place the bonus or side bet(s) at one or more bonus or side bet locations 208, which again may be associated with an input device 32. Again, each of the bonus or side bets may respectively have a required minimum or maximum value. In a preferred embodiment, a player can only place a bonus or side bet if the player also places any required wager, such as the ante wager and secondary wager.

In a step 612, a first number N1 of cards (e.g., 2 or 3 cards) are dealt to each player and the dealer. In an embodiment, the dealer deals or causes the cards to be dealt, such as from one or more decks of physical playing cards. The one or more decks of cards preferably comprise 52 card decks where the cards have a front and a back, wherein the front or face thereof (but not the back) displays card rank and suit indicia comprising the suits Hearts, Diamonds, Spades and Clubs, with the ranks (from lowest to highest) 2-10, Jack, Queen, King and Ace.

In one embodiment, the one or more decks of cards may be shuffled by an automated shuffling device which is located at the gaming table and the dealer may deal cards which are provided by the shuffler. In another embodiment, the dealer might deal the cards from a card shoe located at the gaming table, such as from a card shoe device which stores one or more decks of cards and reads the cards as they are dispensed or dealt therefrom. The card shuffler and/or card shoe may be linked to the table controller 100, such as to provide information regarding read cards and the like.

In one embodiment, the N1 cards are dealt to each participating player, e.g. a player who has placed the required ante and optionally secondary wagers, such as detected and registered by the input devices 32 and/or as confirmed by the dealer. In one embodiment, the cards are dealt to each player at their player position 30 and the dealer's cards are dealt to the dealer position 28. In one embodiment, the player's cards and the dealer's cards are dealt out in an initially face down state.

In a step 613, each player may view his/her dealt cards and then check or place a tertiary or third wager of a first amount (which is also referred to herein as an "All-In" wager). If the player checks, the player does not place a wager. If the player places the tertiary wager, the player preferably places the wager at a tertiary (All-In) wager location 206 at the gaming table 20. Again, this input may be detected by an associated input device 32. In one embodiment, if the player elects to place a tertiary wager at this point in the game, the tertiary wager preferably comprises an integer multiple (e.g., three times) of the player's ante wager.

In a step 614, an optional number N2 of so-called, community cards (e.g. N2 is an integer such as 2 or 3) are dealt. Again, the community cards are preferably dealt by the dealer, preferably from the same deck or decks of physical playing cards. These two cards are preferably dealt face-up on the gaming table 20. The cards may be dealt to specific card locations displayed at the table.

In a step 615, in light of the face-up N2 community cards, each player may again check or again have the option of placing a tertiary wager of a second amount. In one embodiment, only players who have not already placed a tertiary wager may at this time place their tertiary wagers. In one embodiment, and at this point in the game, the tertiary wagers may be required to be at least an integer multiple (e.g., 2 or more times) the player's ante wager. If a player places this tertiary wager, the player preferably places the wager at the tertiary (All-In) wager location 206 on the gaming table 20, which input may be detected by the associated input device 32.

Step 616 (ellipses) represents an optionally further dealing out of face-down player cards and/or face-up community cards and corresponding further checks or wagers. For example, step 616 may include having the dealer deal out one or more additional community cards. Again, the cards are preferably dealt by the dealer, preferably from the same deck or decks of physical playing cards. These additional community cards are preferably dealt face-up on the gaming table 20. The cards may be dealt to specific card locations of the table.

In step 617, each of the players may respectively decide to fold, check or may place further wagers in view of the outcome of steps 614-616. In one embodiment, only players who have not already placed a tertiary (All-In) wager may place further wagers at this point in the game. Further, as indicated in step 618, in one embodiment, if a player who has not yet placed a tertiary wager does not place one at this time, then the player is automatically deemed to have folded and he/she may lose their ante and current secondary wagers. Again, the player preferably places the wager at the tertiary (All-In) wager location 206 on the gaming table 20, which input may be detected by the associated input device 32.

In optional step 619, the dealer reveals the dealer's cards (e.g. in one embodiment, the initial N1 cards which were also dealt to the dealer).

In step 620, the outcome of the game is then determined based on predetermined rules of the game. In one embodiment, the outcomes of the ante wager, the secondary wager and the tertiary (All-In) wager are determined relative to each player's hand and/or the dealer's hand wherein each player's hand comprises a five card hand formed from the three cards dealt to the player and the four community cards, and the dealer's hand comprises a five card hand formed from the three cards dealt to the dealer and the four community cards. In a preferred embodiment, the outcome of the game is determined with reference to flush poker hand rankings of the dealer hand and/or the player hands. Thus, the dealer preferably forms the highest ranking flush hand possible, as does each player. The outcome of the game preferably includes the collecting of losing wagers and bets and paying winnings for winning wagers and bets and/or returning wager or bets, such as in the event of a tie or "push."

As indicated in step 622, in one embodiment, an initial award amount for each winning wager is determined for each respective player by a spinning of the first wheel (WHEEL #1). If the settled on slice of WHEEL #1 (as represented for example by magnification 36a of FIG. 1) includes an award of a further spin on a further, different wheel of chance (e.g., the second-to-be-spun wheel, WHEEL #2) then optional step 624 is performed and its add-on winnings are determined. Ellipses 626 represents optional spinning of further, different wheels of chance (e.g., a third-to-be-spun wheel, WHEEL #3—not shown) if that opportunity is made available by a previous spin. In step 628, the total winnings for each player (optionally including community awards to players) are determined and distributed. The game may then be repeated beginning again with step 611.

While the gaming action (including spinning of one or more wheels of chance) may be presented at a gaming table by a live dealer using physical cards, the game may be presented at an automated gaming table. In the latter embodiment, the cards may be automatically dealt, such as by a card dealing device. It is also possible to present the game at a gaming table using virtual cards in place of or in addition to physical cards. For example, virtual cards may be displayed on one or more video displays. As one example, community cards may be displayed graphically on a common video display and a player's cards may be displayed on a separate player display.

The gaming action might also be presented at one or more electronic gaming devices or gaming machines, or via kiosks or the like which are tied or linked to a gaming table.

Gaming actions that allow for second or yet further-to-be-spun different wheels (e.g., WHEEL #2, WHEEL #3 etc.) can provide numerous advantages. A wider variety of possible rewards can be visually offered to players without having to squeeze all the possible rewards into unduly thin slices of a many-sliced one wheel of chance (e.g., a 16+ sliced wheel). Instead the options can be distributed over two or more wheels with the first-to-be-spun wheel (WHEEL #1) having at least one bonus spin slice that leads to spinning of a next successive wheel. In accordance with one preferred aspect of the present disclosure, the chance to spin the next successive wheel is offered in at least the segment (slice) of the previous wheel where that segment has a relatively smaller (e.g., among the four smallest) of the offered rewards of that wheel (e.g., $R_{min}$) and where that segment provides a one of the relatively largest N (e.g., N=1, 2, . . . 4) of the probabilities of occurrence among the segments of that wheel (e.g., $P_{1a}\geq 0.50$, $P_{1a}\geq 0.25$ or other). This allows game designers a relatively wide degree of freedom in setting the effective probabilities of the segments of the next successively spun wheel (e.g., $P_{1a}\cdot P_{2x}$ products) and the effective total rewards (e.g., corresponding payouts $R_{min}+R_{2x}$ of the segments of the next successively spun wheel. Gaming actions can thus be offered with unique combinations of features and elements which result in a game which his exciting to the players and yet still viable for the house. Among other things the gaming action may offers an exciting rewards step up sequence as a player by-chance advances from the Bronze set of possible rewards, to the Silver medal one and then to the Gold medal set by hitting the bonus spin segments. In one embodiment, the third, or Gold medal wheel of chance offers more community award prizes than the preceding Bronze and Silver medal ones so that non-spinning players will root for the spin actuating player to advance to the Gold medal round, thus making the gaming action more socially rewarding.

Distribution of rewards among a plurality of simpler wheels of chance (e.g., 8 slice wheels denoted progressively as Bronze, Silver and Gold for example) makes the rewards structure easier to understand and more enticing to play. Another aspect of the disclosure of invention is that one or more exciting reward selection events follow the game outcome determination, thus increasing the excitement of the game because the player (and/or community) does/do not know the awards associated with their finishing of the game until the reward selection events (e.g., spinnings of WHEEL #1, WHEEL #2 etc.) have been presented.

In one example, a common wheel spin feature such as described above may be implemented at multiple gaming tables. In one example, the wheel spin feature may be linked to multiple gaming tables, such as to implement and award one or more progressive jackpots—e.g. jackpots which increase over time, such as based upon amounts wagered in the linked games, and which may be awarded to a winning player at any of the linked tables. As one example, each time a player places a side or bonus wager, at one of the linked tables, at least a portion of that wager might be allocated to the progressive jackpot, thus increasing it. By linking multiple tables, greater number of side or bonus wagers are registered against a single progressive jackpot, thus causing its value to increase more quickly.

In the linked configuration, if each linked gaming table presents the same game, the wheel spin feature may be the same for each table. It will be appreciated, however, that if the linked game tables do not present the same games—and particularly where the odds of receiving a bonus wheel spin differ—then a problem arises that players at certain tables or playing certain games may have a different probability of winning the linked jackpot(s).

Figure 7:
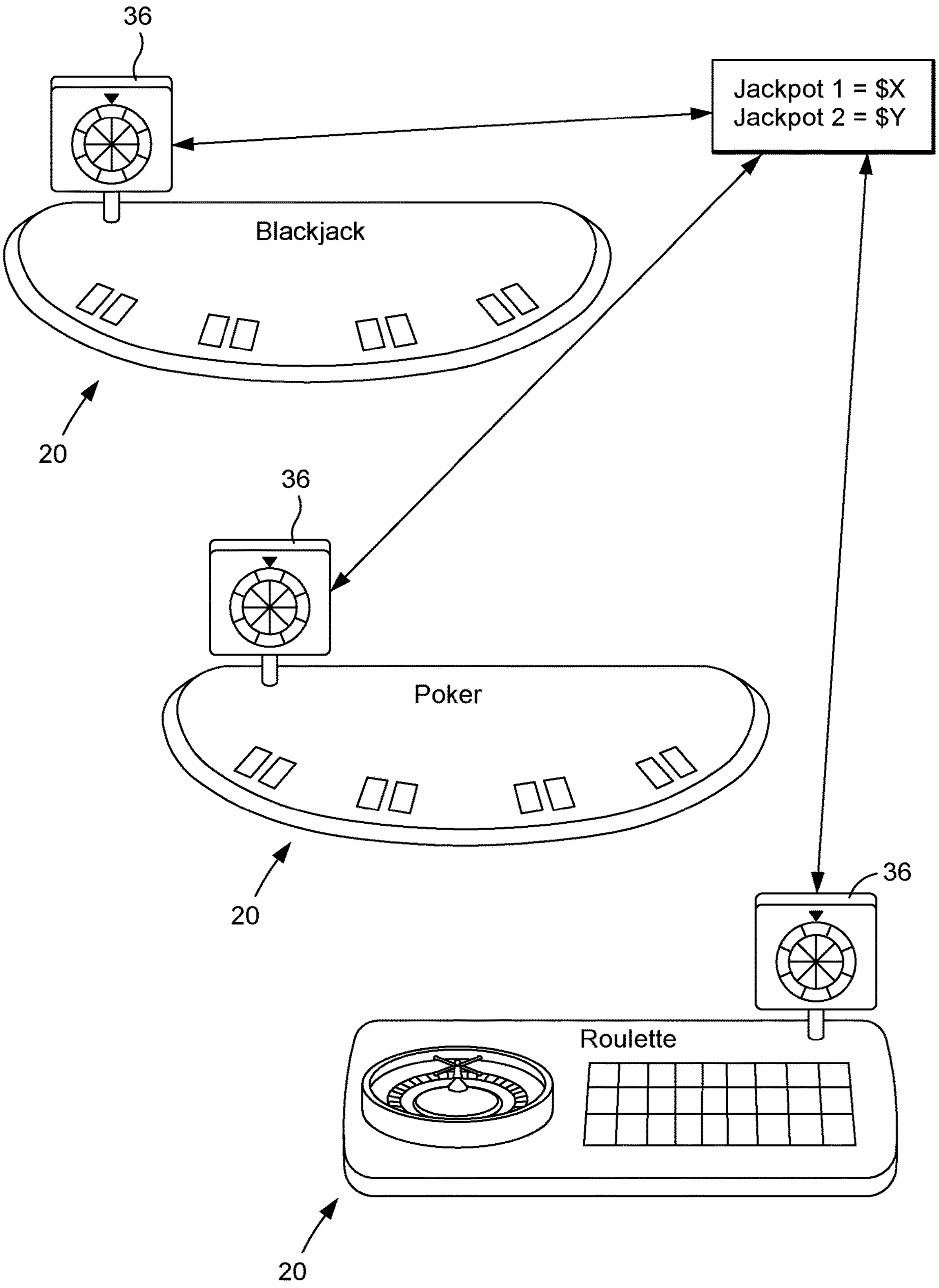
FIG. 7 illustrates linked gaming tables in accordance with another embodiment of the invention.

As one example, FIG. 7 illustrates an example where multiple gaming tables 20 are linked. In this example, one table presents the game of blackjack, another table presents a poker game, and yet another table presents the game of roulette. Each game may offer a bonus wheel spin opportunity, such as upon the occurrence of a particular triggering event, such as a particular game outcome. As one example, the bonus wheel spin triggering event in the blackjack game might comprise a player's receipt of a blackjack hand (such as a natural 21 comprising an Ace and a ten count card), and the bonus wheel spin triggering event in the poker game might comprise a player's receipt of the player's hole cards comprising a Pair.

In this example, the odds of a player receiving a bonus spin when playing the blackjack game are 0.047489 (4.7489%), while the odds of a player receiving a bonus spin when playing the poker game are higher, at 0.058824 (5.28824%). Thus, if the bonus spin events presented relative to these two games are the same, including linked to the same one or more jackpots (such as the illustrated progressive Jackpot 1 having a variable value of $X and the illustrated progressive Jackpot 2 having a variable value of $Y), then the player playing the poker game would have higher odds of winning the jackpot(s) than a player of the blackjack game (because a player of the poker game would have a bonus wheel spin opportunity more often).

In accordance with one example of the invention, the probability of a player receiving a linked jackpot winning outcome via a bonus wheel spin, is normalized (e.g. is controlled so as to be the same for all players playing the different games/tables). In one example, this may be achieved by changing the probability of the selection of a jackpot winning wheel segment or slice as a result of a bonus wheel spin. In the case where the bonus spin comprises the spin of a first wheel and then, in certain circumstances, the spin of a second wheel, the odds of a player achieving a linked jackpot winning outcome is reflected by the relationship: (odds of receiving a bonus spin trigger)*(the odds of a spin of the first wheel resulting in spin of the second wheel)*(the probability of the second wheels spin resulting in the selection of the jackpot winning slice).

In one example, the weight or odds of one of the jackpot winning slices or segments of the wheel are manipulated to achieve those odds, such as according to the relationship: Segment Weight SW=(Final Odds of Winning Jackpot)/(Odds of Second Wheel Spin*Odds of Bonus Wheel Spin Trigger).

Figure 8:
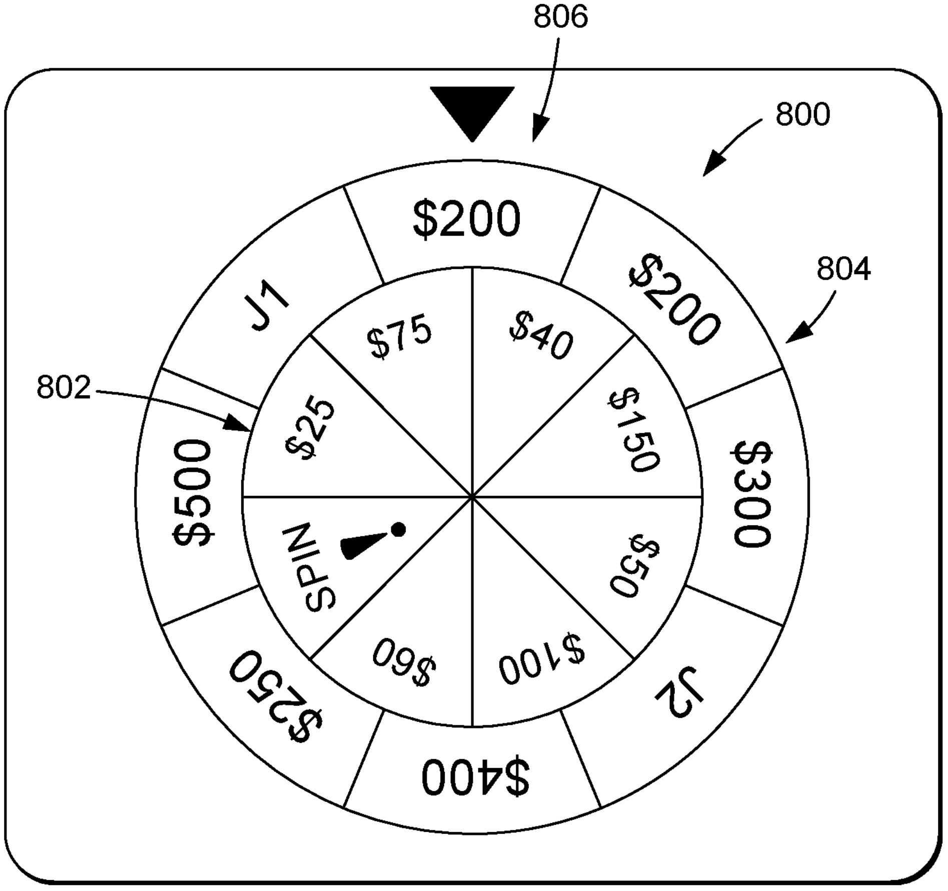
FIG. 8 illustrates another example of graphically displayed first and second bonus spin wheels in accordance with an embodiment of the invention.

An example will be provided in relation to FIG. 8. In this figure, the bonus spin 800 is graphically represented as a spin of a first wheel 802 and, potentially a second wheel 804, relative to an indicator 806. In the example provided, the first and second wheels 802,804 are arranged concentrically. However, as indicated herein, the first and second wheels might be displayed separately, in sequence, etc.

In this example, the first wheel 802 has eight (8) segments or slices, where seven (7) of them display associated prizes and the last one displays a second wheel spin trigger. Where the odds of each slice being selected are the same, the odds of any particular slice being selected—including the second wheel spin trigger—are 0.1666667. In this example, the second wheel 804 also has eight (8) segments or slices, all of which have prizes associated therewith, where those segments or slices include a large progressive jackpot J1 and a small progressive jackpot J2. As indicated herein, the wheels may have other numbers of segments, might display a number of different prizes (some segments or slices might actually have no prize), including one or more associated jackpots, including fixed or progressive jackpots.

Assume that the odds of a player winning a large linked progressive jackpot are set at 1:250,000, or 0.000004, whereas the odds of a player winning a smaller jackpot, such as a smaller linked progressive jackpot, may be 1:25,000, or 0.00004 (of course, these odds might vary, such as depending upon how often the casino desires for the jackpots to be awarded, on average, including based upon the amount that the jackpots are seeded to, the amount of each side or bonus wager that is allocated to the jackpots, etc.).

Relative to the blackjack game described above where the odds of a player receiving a bonus spin are 0.047489 and where the odds of receiving a spin of the second wheel that contains the jackpot slices is 0.1666667 (as indicated above, in the example illustrate in FIG. 8, the odds of a player receiving the second wheel spin are 1/8, but that value can vary depending upon the configuration of the first wheel), then for the large linked progressive jackpot, SW=(0.000004)/(0.047489*0.1666667)=0.00050538, and for the smaller linked progressive jackpot, SW=(0.00004)/(0.047489*0.166667)=0.005053802. Thus, the bonus wheel spin of the second wheel must be arranged so that the odds of the large progressive jackpot slice being selected is 0.00050538, and the odds of the smaller progressive jackpot slice being selected is 0.005053802.

On the other hand, relative to the poker game described above where the odds of a player receiving a bonus spin are 0.058824 and where the odds of receiving a spin of the second wheel that contains the one or more jackpot slices is 0.1666667, then for the large linked progressive jackpot, SW=(0.00004)/(0.058824*0.1666667)=0.000407997, and for the smaller linked progressive jackpot, SW=(0.00004)/(0.058824*0.1666667)=0.004079967.

It is noted that in this configuration, the relationship of the odds of a jackpot winning slice or segment being selected are inversely proportional to the relationship of the odds that a bonus wheel spin trigger is received (e.g. if the odds of receiving a bonus wheel spin trigger at the first game/table are two times greater than at the second game/table, then the odds of the jackpot winning segment being selected are 1:2 as to second wheel spins for players of the first game/table as compared to the second game/table).

The different probabilities of one of the jackpot awarding slices or segments being selected may be implemented in different manners. For example, a first table of outcomes may be generated, which table has outcomes representing the different slices, and where the number of entries in the table which correspond to the slices or segments may vary, so that the odds of selecting an outcome from the table which corresponds to one of the jackpot slices corresponds to the odds calculated as indicated above. In such a configuration, one table would be provided relative to the poker game and another look-up table would be provided relative to the blackjack game and each would be used according to which game triggered the second wheel spin.

It will be appreciated from these examples, that by changing the odds that a progressive jackpot slice is selected, the odds that a player will win one of the jackpots is the same, even though when players are playing different games or games at which the odds of receiving a bonus spin are entirely different. Thus, the progressive jackpots can link different games and yet, the odds of players wining the jackpots can be made equal (thus preventing, for example, players who are playing a game where there is a lower probability of obtaining a bonus spin, from being disadvantaged).

Of course, the principles of the invention may be applied to various games, games having different bonus wheel spin triggers, bonus wheels (including bonus spins where there may be more than two wheels, where the wheels may have different numbers of segments or slices than as shown in FIG. 8), etc.

Because physical instantiations of signals representing information and program instructions may be employed to implement the systems/methods described herein, the present disclosure of invention relates to tangible (non-transitory) machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure of invention has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. A method of presenting a customizable number of selectable bonus awards relative to a first game presented to one or more players at a first gaming table and relative to a second game presented to one or more players at a second gaming table, comprising the steps of:

providing said first gaming table having a first playing surface and a first game layout associated with said first playing surface, said first game layout defining at least one first game wager location, at least one wager input sensor associated with said at least one first game wager location;

providing said second gaming table having a second playing surface and a second game layout associated with said second playing surface, said second game layout defining at least one second game wager location, at least one wager input sensor associated with said at least one second game wager location;

providing at least one video display at or adjacent to the first gaming table[M] and at least one video display at or adjacent to the second gaming table;

communicatively linking a gaming action controller to the at least one video display associated with the first gaming table and the at least one video display associated with the second gaming table, and the at least one wager input sensor of each of said first and second gaming tables;

detecting, using said at least one wager input sensor at said first gaming table, at least one wager placed by at least one of the players at said first gaming table at said at least one first game wager location at said first gaming table;

receiving, at said gaming action controller from said at least one wager input sensor of said first gaming table, an input regarding said at least one wager;

presenting, at said first gaming table, said first wagering game using one or more physical game pieces;

determining an outcome of said first wagering game;

detecting, using said at least one wager input sensor at said second gaming table, at least one wager placed by at least one of the players at said second gaming table at said at least one second game wager location at said second gaming table;

receiving, at said gaming action controller from said at least one wager input sensor of said second gaming table, an input regarding said at least one wager;

presenting, at said second gaming table, said second wagering game using one or more physical game pieces;

determining an outcome of said second wagering game;

providing input to the gaming action controller of a bonus event trigger occurring in relation to either said first wagering game at the first gaming table or the second wagering game at the second gaming table, wherein said bonus event trigger has first odds of occurrence in relation to said first wagering game and said bonus event trigger has second odds of occurrence in relation to said second wagering game; and causing the presentation of a bonus event comprising:

graphically displaying, on the at least one video display at the gaming table at which said bonus event trigger was received, a bonus award indicator comprising a first wheel, the first wheel comprising a plurality of segments, at least one of the plurality of segments of the first wheel displaying a first award and at least one, but not all, of the plurality of segments of the first wheel displaying an indication of a spin of a second wheel;

receiving a spin input from one of the players of the gaming table at which said bonus event trigger was received;

causing, in response to the spin input, a graphical display of a selection of one of the plurality of segments of the first wheel on the at least one video display of the gaming table at which said bonus event trigger was received by the gaming action controller, the selection comprising the steps of graphically displaying relative movement between the first wheel and a selector and the selection of the one of the plurality of segments with reference to the selector;

when the selected segment of the first wheel does not display an indication of a spin of the second wheel, not spinning the second wheel, wherein said first award indicated by the selected segment comprises a bonus award to said player;

when the selected segment does display an indication of a spin of the second wheel, transforming, via said gaming action controller, said bonus award indicator to graphically display said second wheel on the at least one video display, the second wheel comprising a plurality of segments wherein at least one of the plurality of segments displays a second award associated with a second wheel prize, and graphically displaying a selection of one of the plurality of segments of the second wheel on the at least one video display at the gaming table at which the bonus event trigger was received by the gaming action controller for award to the player any second award associated with the selected segment of the second wheel;

wherein the odds of a particular one of said plurality of segments of said second wheel being selected are different when said bonus spin event is presented at said first gaming table than said second gaming table, wherein said odds of selection differ so that overall odds of a player winning the prize associated with said particular segment at said first gaming table are the same as overall odds of a player winning the prize associated with said particular segment at said second gaming table.

2. The method of claim 1, wherein said particular one of said plurality of segments has a progressive jackpot award associated therewith.

3. The method of claim 1, wherein said first and second wheels are graphically displayed in a concentric relationship.

4. The method of claim 1, wherein a relationship of the odds of said particular one of said plurality of segments of said second wheel being selected when said bonus spin event is presented at said first gaming table than said second gaming table are inversely proportional to a relationship between said first odds and said second odds.

5. The method of claim 1, wherein said selection of one of the plurality of segments of the second wheel is based upon selection of an outcome from a lookup table.

6. The method of claim 5, wherein said lookup table comprises a first table of outcomes when said bonus spin event is presented at said first gaming table and a second table of outcomes when said bonus spin event is presented at said second gaming table.

7. The method of claim 1, wherein at least one segment of said first wheel displays a second wheel spin and all other segments of said first wheel display prizes and wherein at least one segment of said second wheel displays a jackpot prize.

8. A bonus generating system for implementing a bonus event at a plurality of gaming tables at which at least a first game and a second game are presented to one or more players, where the first game has first odds of triggering the bonus event and the second game has second odds of triggering the bonus event, comprising:

a first gaming table having a first playing surface and a first game layout associated with said first playing surface, said first game layout defining at least one first game wager location, at least one wager input sensor associated with said at least one first game wager location;

a second gaming table having a second playing surface and a second game layout associated with said second playing surface, said second game layout defining at least one second game wager location, at least one wager input sensor associated with said at least one second game wager location;

at least one video display at or adjacent to the first gaming table and at least one video display at or adjacent to the second gaming table;

a bonus action controller communicatively linked to the at least one video display associated with said first gaming table and the at least one video display associated with the second gaming table, and the at least one wager input sensor of each of said first and second gaming tables, the bonus action controller configured to:

receive from said at least one wager input sensor of said first gaming table, an input regarding said at least one wager;

receive from said at least one wager input sensor of said second gaming table, an input regarding said at least one wager;

receive, in relation to said first game presented at said first gaming table using one or more first physical game pieces and said second game presented at said second gaming table using one or more second physical game pieces, input of a bonus triggering event occurring at one of said first or second gaming tables;

generate an outcome of a spin of a first wheel and, when the outcome of the first wheel spin comprises an outcome which corresponds to a spin of a second wheel, generate an outcome of a spin of the second wheel;

cause the video display at the triggering table to display a bonus award indicator comprising a graphical representation of the first wheel, the first wheel comprising a plurality of segments, at least one of the plurality of segments of the first wheel displaying a first award and at least one of the plurality of segments of the first wheel, but not all of the segments, displaying an indication of a spin of the second wheel;

cause the video display at the triggering table to display a transformation of the graphical representation of the first wheel to a graphical representation of a selection of one of the plurality of segments of the first wheel corresponding to the generated outcome of the spin of the first wheel;

when the selected segment of the first wheel does not display an indication of a spin of the second wheel, indicate an award of any first award indicated by the selected segment but not spinning the second wheel;

when the selected segment does display an indication of a spin of the second wheel, transform said bonus indicator by graphically displaying said second wheel on the at least one video display associated with the gaming table at which the bonus event trigger was received, the second wheel comprising a plurality of segments wherein at least one of the plurality of segment of the second wheel displays a second award associated with a second wheel prize, and graphically display a selection of one of the plurality of segments of the second wheel corresponding to the generated outcome of the second wheel spin, and indicate an award any second award associated with the selected segment of the second wheel;

where the odds of a particular one of said plurality of segments of said second wheel being selected are different when said bonus event is presented based upon a trigger by said first game than said second game, wherein said odds of selection differ so that overall odds of a player winning the prize associated with said particular segment as a result of play of said first game are the same as overall odds of a player winning the prize associated with said particular segment as a result of play of said second game.

9. The system of claim 8, wherein said particular one of said plurality of segments has a progressive jackpot award associated therewith.

10. The system of claim 8, wherein said first and second wheels are displayed in a concentric relationship.

11. The system of claim 8, wherein a relationship of the odds of said particular one of said plurality of segments of said second wheel being selected when said bonus spin event is presented relative to said first game than said second game are inversely proportional to a relationship between said first odds and said second odds.

12. The system of claim 8, wherein said selection of one of the plurality of segments of the second wheel is based upon selection of an outcome from a lookup table.

13. The system of claim 12, wherein said lookup table comprises a first table of outcomes when said bonus spin event is presented relative to said first game and a second table of outcomes when said bonus spin event is presented relative to said second game.

14. The system of claim 8, wherein at least one segment of said first wheel displays a second wheel spin and all other segments of said first wheel display prizes and wherein at least one segment of said second wheel displays a jackpot prize.

15. A method of generating and displaying a number of selectable bonus awards relative to a first game presented to one or more players at a first gaming table and a second game presented to one or more players at a second gaming table, comprising the steps of:

receiving, at a gaming action controller, in relation to said first game presented at said first gaming table, a first input regarding at least one physical wager detected by at least one wager input sensor located at the first gaming table;

receiving, at the gaming action controller, in relation to said second game presented at said second gaming table, a second input regarding at least one physical wager detected by at least one wager input second located at the second gaming table;

receiving, at said gaming action controller, a third input regarding a bonus triggering event occurring in relation to said first game presented at said first gaming table or said second game presented at said second gaming table;

generating, at said gaming action controller, a bonus award indicator comprising a first wheel, the first wheel comprising a plurality of segments, at least one of the plurality of segments of the first wheel displaying a first award and at least one, but not all, of the plurality of segments of the first wheel displaying an indication of a spin of a second wheel;

displaying on the at least one video display at which the bonus triggering event occurred, in response to communications from said gaming action controller, a first graphical rendering of the generated bonus award indicator;

receiving, at said gaming action controller, a spin input from one of said players at the gaming table at which said bonus triggering event occurred;

displaying, in response to the received spin input at said gaming action controller, a second graphical rendering of a selection of one of the plurality of segments of the first wheel comprising a rendering of relative movement between the first wheel and a first selector;

when the displayed selected segment of the first wheel is not the indication of a spin of the second wheel, causing the at least one display device to display any first award indicated by the selected segment; and when the displayed selected segment of the first wheel is the indication of a spin of the second wheel:

i. transforming, at said gaming action controller, the bonus award indicator to comprise said second wheel, the second wheel comprising a plurality of second segments, at least one of the plurality of second segments of the second wheel displaying a second award;

ii. displaying on the at least one video display, in response to communications from said gaming action controller, a third graphical rendering of the transformed bonus award indicator;

iii. displaying, on the at least one video display, in response to communications received from said gaming action controller, a fourth graphical rendering comprising a rendering of relative movement between the second wheel and a second selector; and iv. causing the at least one display device to display any second award indicated by the selected second segment;

where the odds of a particular one of said plurality of segments of said second wheel being selected are different when said bonus event is presented based upon a trigger by said first game than said second game, wherein said odds of selection differ so that overall odds of a player winning the prize associated with said particular segment as a result of play of said first game are the same as overall odds of a player winning the prize associated with said particular segment as a result of play of said second game.

16. The method in accordance with claim 15, wherein said third input is received from a dealer to said gaming action controller.

17. The method in accordance with claim 16, wherein said first and second wheels are displayed in a concentric relationship.

* * * * *